(12) United States Patent
Stewart et al.

(10) Patent No.: US 7,305,823 B2
(45) Date of Patent: Dec. 11, 2007

(54) ACTIVE IMPEDANCE MATCHING SYSTEMS AND METHODS FOR WAVE ENERGY CONVERTER

(75) Inventors: David B. Stewart, Cranbury, NJ (US); James S. Gerber, St. Paul, MN (US)

(73) Assignee: Ocean Power Technologies, Inc, Pennington, NJ (US)

( * ) Notice: Subject to any disclaimer, the term of this patent is extended or adjusted under 35 U.S.C. 154(b) by 284 days.

(21) Appl. No.: 11/035,323

(22) Filed: Jan. 13, 2005

(65) Prior Publication Data

US 2007/0261404 A1 Nov. 15, 2007

Related U.S. Application Data

(60) Provisional application No. 60/536,645, filed on Jan. 15, 2004, provisional application No. 60/536,397, filed on Jan. 14, 2004.

(51) Int. Cl.
*F03C 1/00* (2006.01)
(52) U.S. Cl. .............................. 60/495; 60/496; 290/42; 290/53
(58) Field of Classification Search .................. 60/495, 60/496, 398; 290/42, 53
See application file for complete search history.

(56) References Cited

U.S. PATENT DOCUMENTS

| | | | | |
|---|---|---|---|---|
| 4,260,901 A | * | 4/1981 | Woodbridge | 290/42 |
| 4,491,738 A | * | 1/1985 | Kamp | 290/43 |
| 6,812,588 B1 | * | 11/2004 | Zadig | 290/53 |
| 2002/0047273 A1 | * | 4/2002 | Burns et al. | 290/53 |

* cited by examiner

*Primary Examiner*—Hoang Nguyen
(74) *Attorney, Agent, or Firm*—Henry I. Schanzer

(57) ABSTRACT

The invention relates to active impedance matching systems (AIMS) and methods for increasing the efficiency of a wave energy converter (WEC) having a shaft and a shell intended to be placed in a body of water and to move relative to each other in response to forces applied to the WEC by the body of water. The system includes apparatus for: (a) extracting energy from the WEC and producing output electric energy as a function of the movement of the shell (shaft) relative to the shaft (shell): and (b) for selectively imparting energy to one of the shell and shaft for causing an increase in the displacement and velocity (or acceleration) of one of the shell and shaft relative to the other, whereby the net amount of output electrical energy produced is increased. The apparatus for extracting energy and for selectively supplying energy may be implemented using a single device capable of being operated bi-directionally, in terms of both direction and force, or may be implemented by different devices.

33 Claims, 20 Drawing Sheets

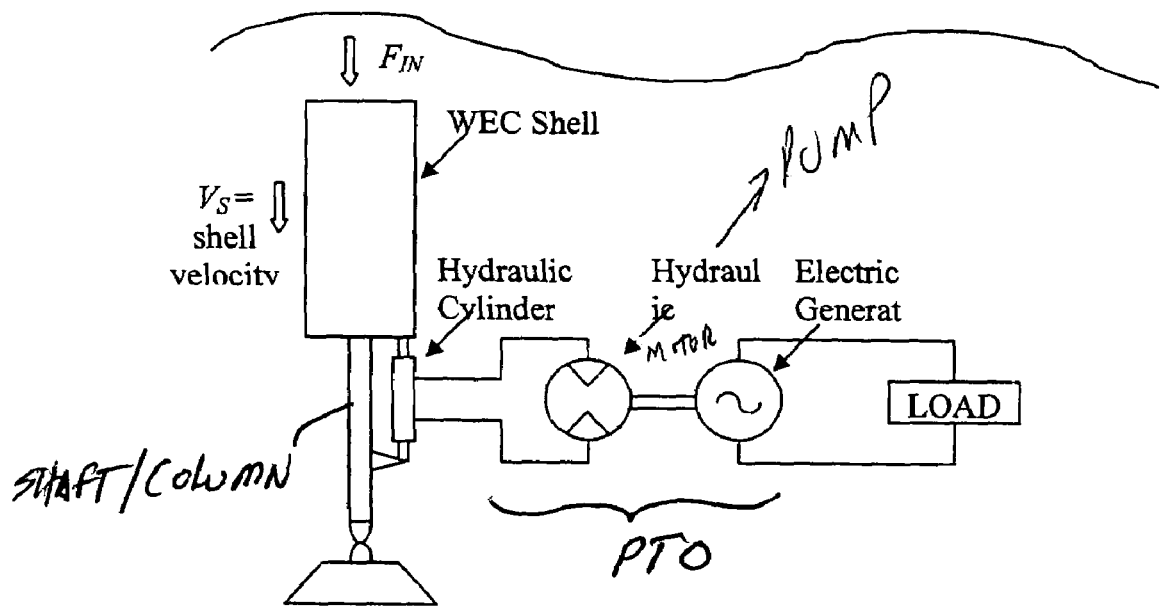
FIG 2A    Simplified Block Diagram OF WEC.

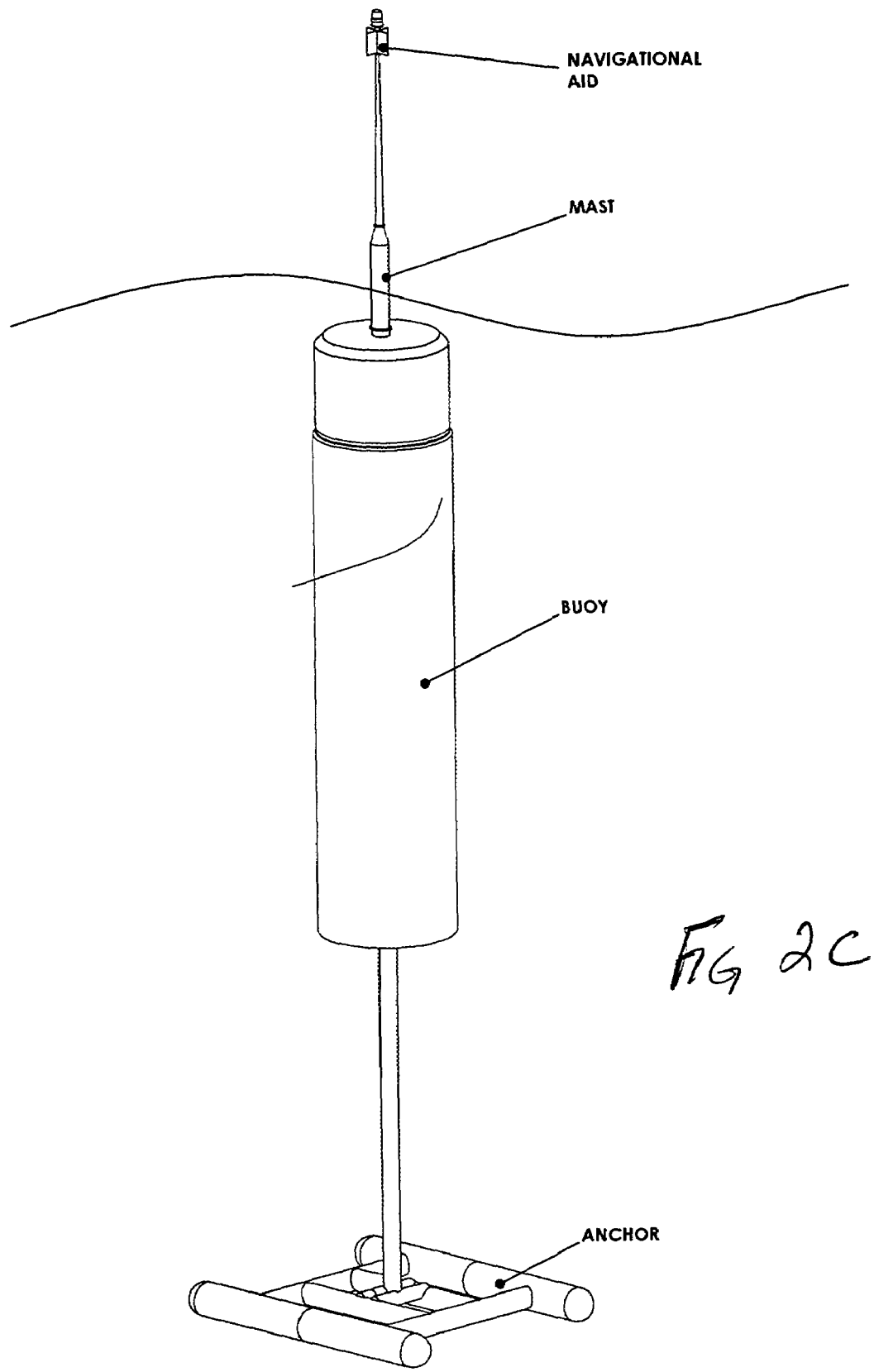

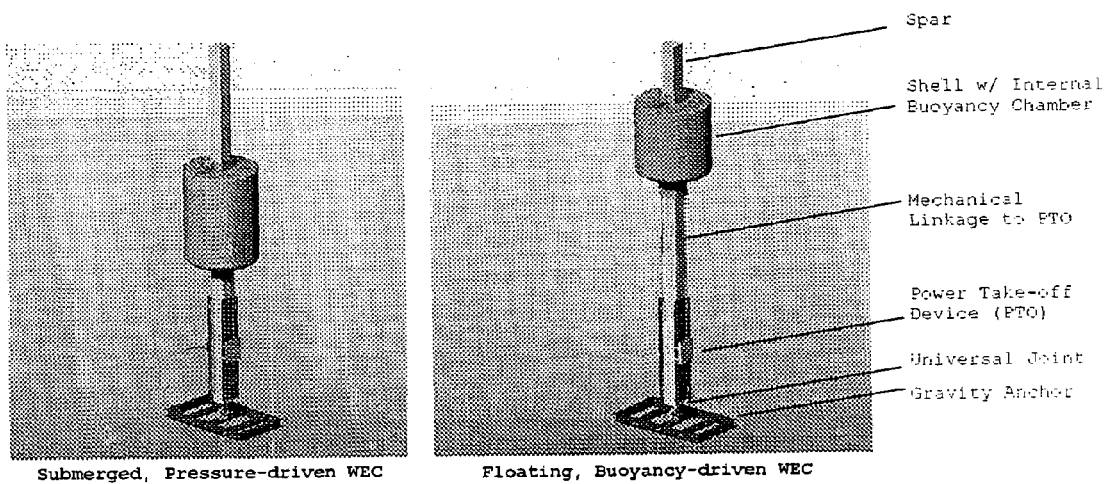
FIG 2D — Submerged, Pressure-driven WEC
FIG 2E — Floating, Buoyancy-driven WEC

ACTIVE IMPEDANCE MATCHING SYSTEMS AND METHODS FOR WAVE ENERGY CONVERTER

CROSS REFERENCES TO RELATED APPLICATIONS

This application claims priority from provisional patent application Ser. No. 60/536,645 titled ACTIVE IMPEDANCE MATCHING SYSTEMS FOR WAVE ENERGY CONVERTER filed Jan. 15, 2004, the teachings of which are incorporated herein by reference. This application also claims priority from provisional patent application Ser. No. 60/536,397 titled current Flow Energy Converter filed Jan. 14, 2004, the teachings of which are incorporated herein by reference.

BACKGROUND OF THE INVENTION

This invention relates to the conversion of energy from naturally occurring sources of mechanical energy, such as the mechanical energy present in ocean surface waves or current flow in water, streams and air, to electrical energy and, in particular, to the efficient production and transfer of electric energy.

Various wave energy converter (WEC) systems are known. For example, reference is made to U.S. patent application Ser. No. 09/379,421 filed Aug. 21, 1999, titled "Wave Energy Converter Utilizing Pressure Difference", assigned to the assignee of the present application and the teachings of which are incorporated herein by reference.

Numerous problems exist in the design of a mechanical system for harnessing the energy contained in ocean waves. Particularly, a problem exists in harnessing this energy efficiently. To begin with, there is a problem in converting wave energy to usable mechanical motion and force. In addition, there is a further problem of converting the mechanical energy into electrical energy in an efficient manner. A significant difficulty in increasing the efficiency of converting the ocean wave energy into electric energy is due to the fact that the waves vary continuously in amplitude, frequency and phase as a function of time.

Various concepts have been proposed to try to increase the efficiency of converting wave energy to electric energy using WECs. In some of these systems, the mechanical components of the WECs are "tuned" to have a high efficiency when operating with ocean waves of a specific frequency. Given the narrowband behavior of these systems and the highly variable nature of ocean waves, the overall efficiencies of such systems are poor.

It has also been proposed to adjust the mechanical properties of the WEC to take into account the predominant wave frequency over a period of time. Incorporating such a proposal requires mechanical devices that change the spring, mass and damping properties of the WEC. However, to effectuate the called for proposed adjustments to the mechanical properties of a WEC is problematic since there is no practical way to provide continuous, or multiple level, tuning of the system.

Another scheme for increasing the efficiency of a WEC is shown in U.S. Pat. No. 6,731,019, based on application Ser. No. 09/922,877 filed Aug. 6, 2001 titled "Apparatus and Method for Optimizing the Power Transfer Produced by a Wave Energy Converter (WEC)" assigned to the assignee of the present application and the teachings of which are incorporated herein by reference. In this patented system, the electromechanical device is controlled and its mechanical behavior is altered to increase its energy conversion efficiency by tuning the output load.

In all of the known proposed wave energy converter efficiency-boosting schemes, the energy storage and/or tuning components are large and/or expensive making it difficult and/or expensive to produce commercially viable products. In addition, the known systems tend to be reactive (i.e., do not anticipate certain wave conditions) and pro-active control over the behavior of the WEC.

SUMMARY OF THE INVENTION

Applicants' invention resides, in part, in the use of active impedance matching systems (AIMS) to provide means to tune the response of a WEC's electromechanical system to maximize the efficiency of the WEC. The AIMS technology anticipated for use by Applicants combines computer-based algorithms and advanced hardware.

A WEC embodying the invention includes a shell and a shaft which are designed to move relative to each other to convert the force of the waves into mechanical energy. In the discussion to follow, the shell is generally depicted or referred to as the moving member and the shaft as the non-moving or mechanically grounded member. But, the opposite may be the case and even both the shaft and shell may move relative to each other. The WEC includes a power-take-off device (PTO) coupled between the shell and the shaft to convert the mechanical power available from the WEC into electrical energy. This is the desired output which is to be produced as efficiently as possible.

Applicants' invention resides, in part, in the use of apparatus and methods for increasing the displacement and velocity (and the acceleration) of the shell to increase the power available from the WEC and the electric output from its PTO. According to one aspect of the invention, the displacement and velocity (and acceleration) of the shell is increased by selectively supplying energy to the shell during portions of a wave cycle; where the energy supplied is obtained from a source previously supplied by the PTO or from an independent source. Although energy is expended to move the shell, the movement is such that there is a significant net gain in the power generated by the WEC.

In a system embodying the invention a means is provided to absorb or obtain energy from the WEC and which selectively imparts energy to the WEC so as to increase the displacement and velocity (and the acceleration) of the shell for increasing the net energy produced by the WEC. This is in contrast to a typical power capturing system, which can only absorb mechanical energy. The energy absorbing means and the energy imparting means may be implemented by the same device capable of operating bi-directionally (in two different modes) or it may be implemented using one device optimized for power absorption from the WEC-shell and another device optimized to impart (supply) energy to the WEC-shell.

In systems embodying the invention a PTO coupled between the shell and shaft may be a generator (or an equivalent mechanical or hydraulic device) for converting the energy available from the WEC into electrical energy. As noted above, it is desirable, though not necessary, that the PTO-generator also be able to function as a motor (or a like mechanical or hydraulic device) which when supplied with power can cause the desired movement between the shell and the shaft of the WEC. Thus, in systems embodying the invention, when a single device is used the PTO must selectively be able to function as both a power supplying device (PSD) and a power extraction device.

Applicants' invention also includes a method to control the electrical load of the electrical generator driven by the WEC so as to match the impedance of the WEC load to the input so as to maximize conversion efficiency and power output.

The invention may be implemented using a 4-quadrant power converter which controls the flow of power to or from the PTO/PSD. By way of example, the PTO/PSD may be a generator/motor or an equivalent mechanical or hydraulic device. In systems making use of a generator/motor device, at times, the generator functions as a load on the buoy (WEC) extracting energy from it, while at other times it expends energy and functions as a motor applying a force (and energy) to the buoy. The 4-quadrant power converter used in systems embodying the invention may be computer controlled so as to either enable current to be drawn form the system or for current to be supplied to the system. The computer algorithm may be used to adjust generator current as a function of buoy speed, position and/or acceleration. The computer may be programmed to determine when and how energy is supplied to the WEC-shell to optimize the desired electric output.

BRIEF DESCRIPTION OF THE DRAWINGS

In the accompanying drawing like reference characters denote like components.

FIGS. 2A-2E are diagrams showing and identifying different WEC structures and components which may used to practice the invention;

DETAILED DESCRIPTION OF THE INVENTION

Figure 1:
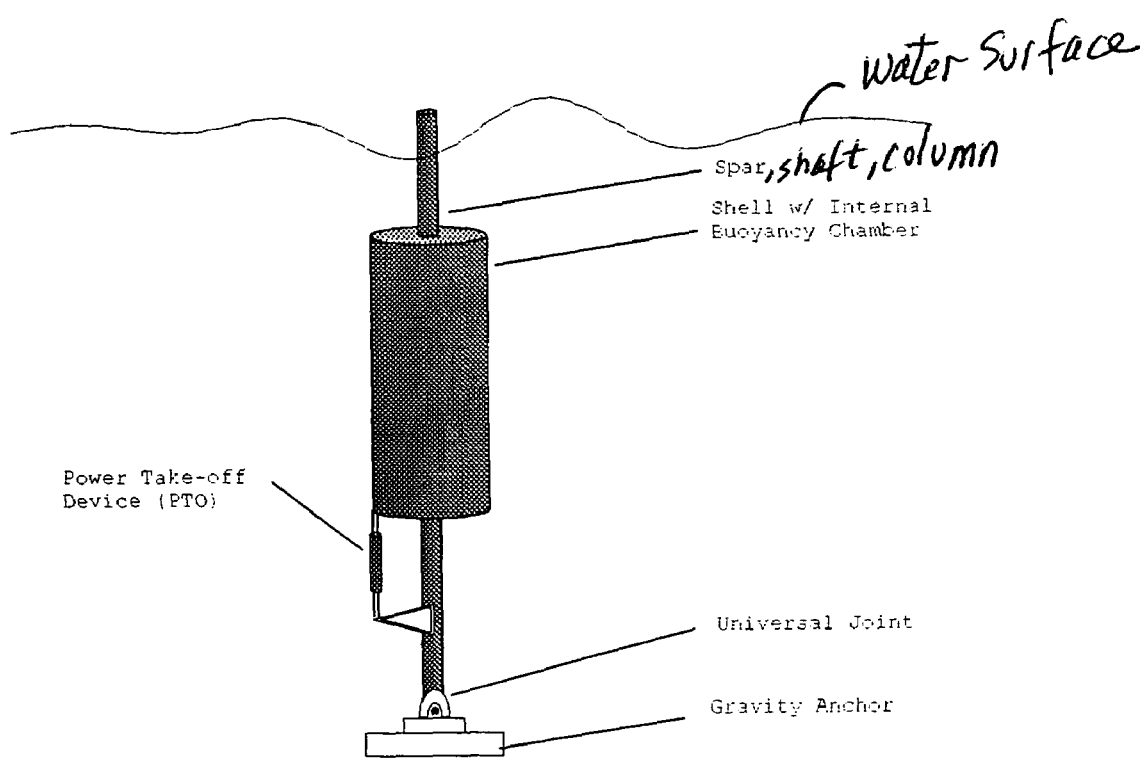
FIG. 1 is a diagram identifying various relevant components of a WEC system deployed in a body of water which may be used to practice the invention.
Figure 1A:
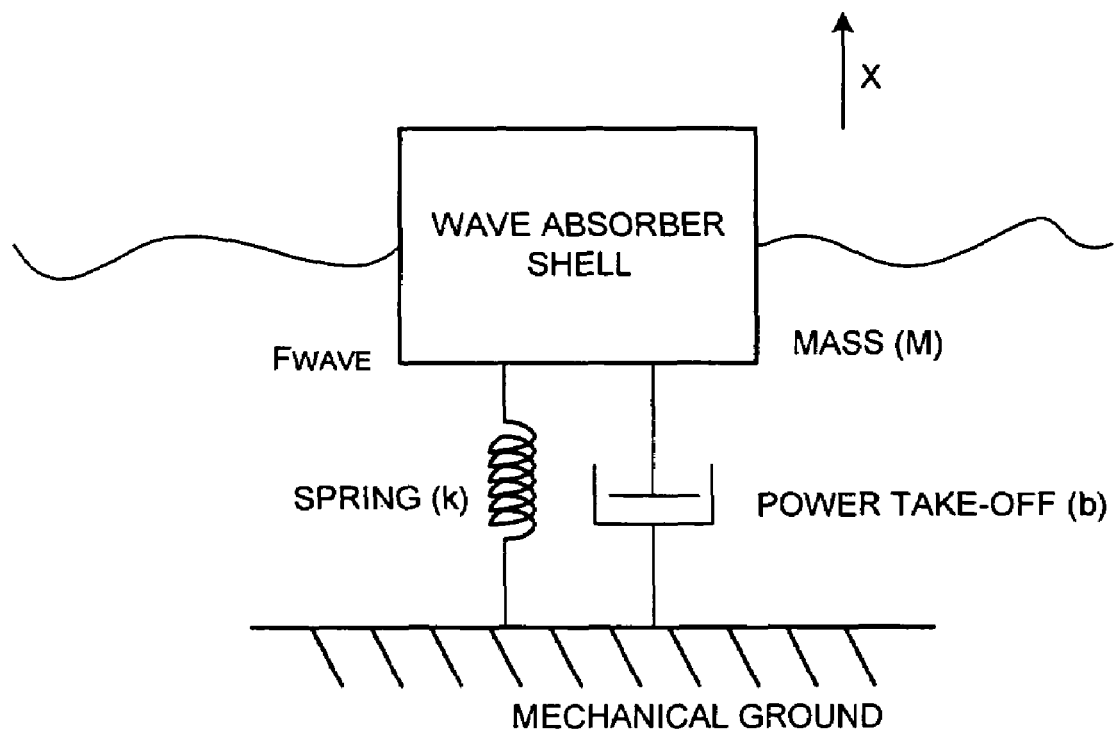
FIG. 1A is a simplified mathematical model of a WEC which may be used to practice the invention.
Figure 2B:
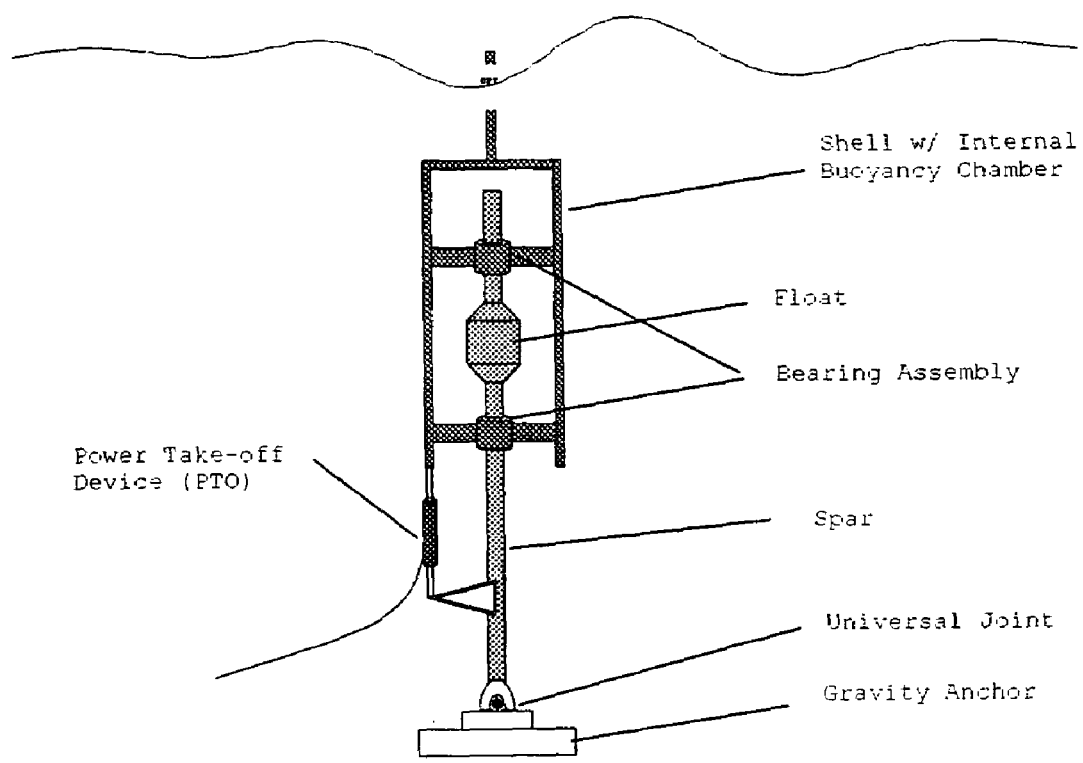
Figure 3:
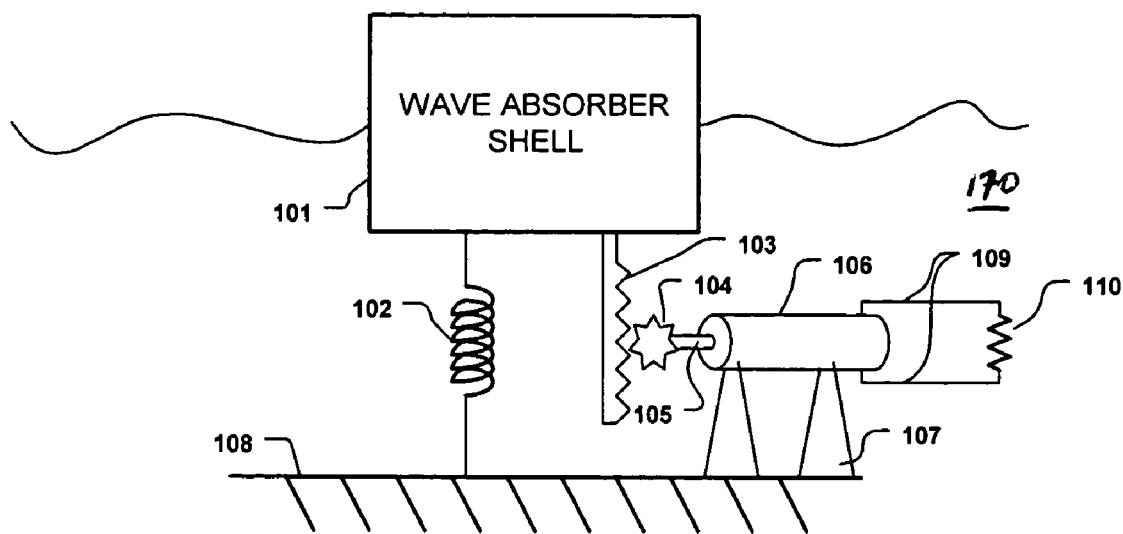
FIG. 3 is a block diagram of a prior art WEC system, showing a WEC 101 which is coupled to mechanical ground 108 via a mechanical spring 102 and a damper 170 comprised of elements 103,104, 105,106,109 and 110.
Figure 4:
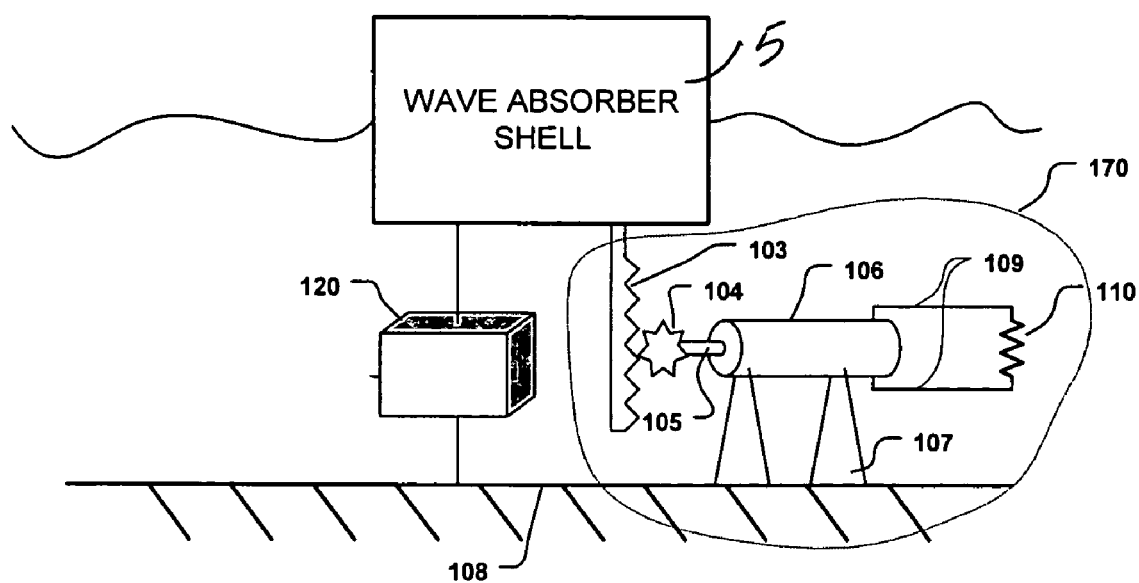
FIGS. 4 through 6 illustrate various systems and methods to 'tune' the mechanical properties of a WEC for optimizing the extraction of energy from ocean waves, in accordance with the invention.

FIG. 4 illustrates a system embodying the invention in which a WEC-shell 5 is coupled to a power-take-off device (PTO) 170 at whose output is produced the desired electrical energy extracted from the WEC. FIG. 4 also shows an electrical/electronic control module 120 connected between the moving shell 5 and mechanical ground (i.e., the shaft of the WEC). Control module 120 is used to perform the function of a spring corresponding to the mechanical spring of the type shown in FIG. 3. However, the function(s) performed by module 120 define significantly over the function of the spring 102 shown in FIG. 3, in that the spring 102 is a passive device, while module 120 (as discussed below) is an active device, programmed to control when and how energy is supplied to the WEC-shell in order to increase the net power absorbed by the WEC from the waves and which is made available to the PTO for producing a desirable increased output voltage and current.

Figure 5:
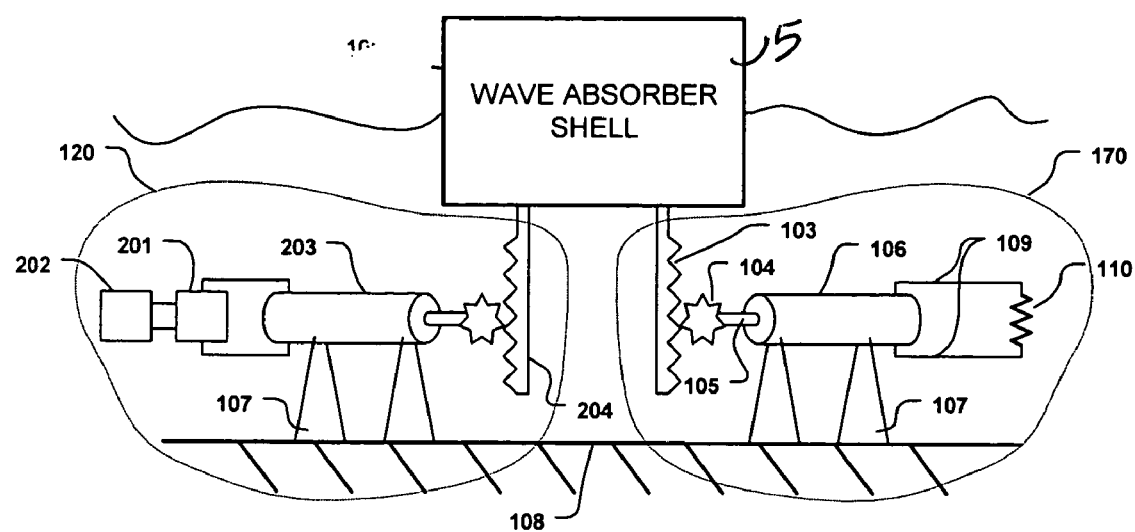

FIG. 5 illustrates that the module 120 used to produce a "spring-like" function includes an energy storage module 202 (which may be a local or an external source of power), a control module 201 for controlling the application of the power from power source 202 to a motor 203 for driving a linear to rotary translator 204. The control module 201 may include a computing device, as shown in FIGS. 7A-8 and 11,11A. As shown in those figures the control module may be driven and controlled by command signals (not shown in FIG. 4 or 5) for controlling when and how the motor 203 is driven. Module 201 may also include a 2 or 4-quadrant power converter for controlling the application of power to the motor.

In FIGS. 4 and 5, the PTO 170 includes a linear to rotary translator (103,104, 105) driving a generator 106 for producing an output voltage applied via lines 109 to a load 110.

Figure 6:
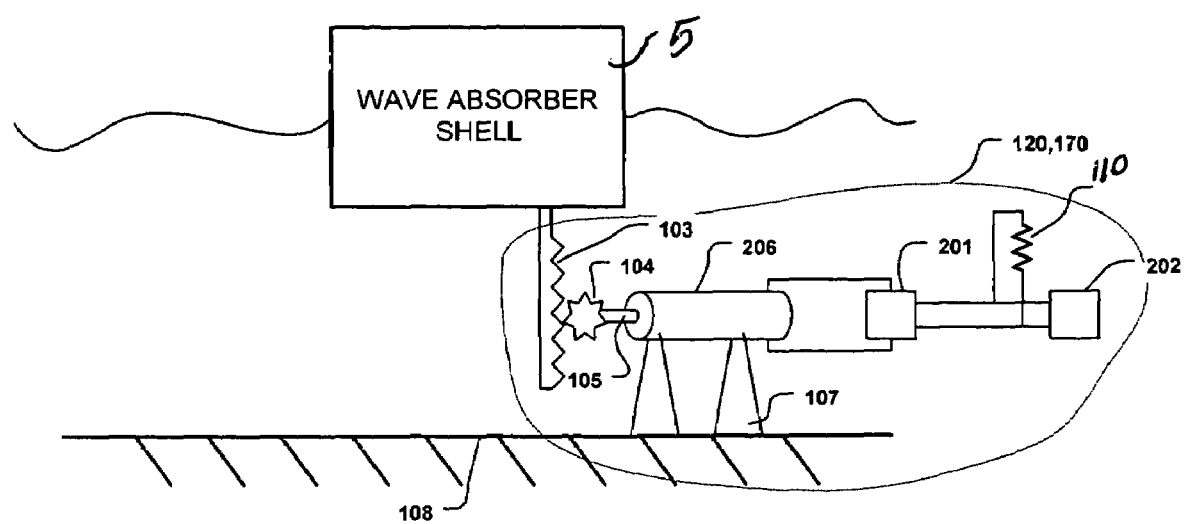

FIG. 6 illustrates a system embodying the invention in which several of the function(s) to be performed by module 120 and by PTO 170 may be performed using the same equipment; but in this case equipment is selected which can function bi-directionally and the equipment is operated bi-directionally to achieve the desired functions. Thus, in FIG. 6, module 120 and 170 are combined into a single block which contains a motor/generator 206 and a control module 201 which includes a 4-quadrant power converter and a computing device. As detailed below, for one condition of signals, power absorbed by the shell 5 drives the linear to rotary translator 103, 104, 105 and causes motor/generator 206 to function as a generator producing a desired electrical output voltage and current which is coupled via the 4-quadrant power converter in module 201 to supply an output load 110, which for ease of description is shown as a resistor, but which could be a complex load, as shown in the other figures.

In order to better understand the discussion to follow, it should be noted that, as shown in several of the figures, a WEC embodying the invention includes a shell and a shaft which are designed to move relative to each other to convert the force (F1) of the waves into mechanical energy. In the discussion to follow, the shell is generally depicted, or referred to, as the moving member and the shaft as the non-moving or mechanically grounded member. But, the opposite may be the case and even both the shaft and shell may move relative to each other. The WEC includes a PTO coupled between the shell and the shaft to convert the mechanical power available from the WEC into electrical energy. Thus, the WEC is used to extract, or absorb, power (energy) from the waves and the PTO in turn extracts power (energy) from the WEC and functions as a damper on the WEC.

Water waves acting on a wave energy conversion device (WEC) will exert a force (F1) on the WEC-shell due to the changes in water pressure caused by the wave. The power absorbed by the WEC (which can subsequently be used to produce and/or generate electricity by the WEC) due to the waves is equal to the force (F1) of the wave times the velocity (v) of the WEC (shell) as it moves;

$$[P=(F1)\times(v)].$$

It is known that in many situations where an object is responding to wave forces, that the force (F1) of the wave applied to the object (WEC) is independent of the motion of that object (i.e., the wave force felt by a stationary object is approximately equal to the wave force felt by a slowly moving object). Hence, if it is desired to increase the power absorbed by a particular WEC (and to have more power available from a WEC), this can only be done by increasing the velocity of the WEC, (the force of the waves not being controllable). For example, a doubling of the velocity of the WEC will lead to an instantaneous doubling in the mechanical power absorbed by the WEC. This can then be available from the WEC for conversion to electrical energy.

Applicants' invention resides, in part, in the use of apparatus and methods for increasing the displacement and the velocity of the WEC-shell to increase the net power available from the WEC and to increase the electric output from the WEC's PTO. According to one aspect of the invention, the displacement and the velocity of the WEC are increased by selectively applying energy to the WEC during portions of a wave cycle. This includes a computer based system to determine when the energy should be supplied to best achieve the desired results. It also includes the selection of appropriate system signals (e.g., displacement, velocity, acceleration) to determine when and how energy should be supplied to the WEC-shell. The energy supplied to drive the WEC-shell is obtained either from a power source previously supplied/charged by the PTO or from an independent source. Although energy is drawn from the system to move the WEC-shell, the movement of the WEC-shell is such that the shell will produce more energy as a result of the movement and there is a significant net gain in the power generated by the WEC.

As detailed below, an aspect of the invention is the ability to impart mechanical power in a controlled manner and at controlled, selected times to the WEC-shell to increase its displacement and velocity at selected points of the wave cycle. This is in contrast to a typical power capturing system, which can only absorb mechanical energy.

The invention applies to all WECs, even where they have different positional restoring forces. For example, a submerged WEC-shell will tend to have "weak" positional restoring forces, while a WEC-shell floating on the surface of the water will tend to have "strong" positional restoring forces.

Positional restoring forces are forces which tend to cause the shell of the WEC to return to some "rest" or "neutral" location. This force can be the result of hydrostatic restoring (i.e. a floating hull will return to its initial position when displaced) or some mechanical spring (e.g. a large coil spring fixed between the shell of the WEC and the WEC grounding component). "Weak and "strong" positional restoring forces refer to the size of the restoring forces relative to the inertial forces required to oscillate the WEC-shell at the frequency of the surface waves. While the general characteristics of the AIMS apparatus and method are the same for the cases of strong and weak positional restoring force, the operation for the two cases differs in some respects, as discussed below. in any event, it is shown that by application of the invention the amount of energy extracted from the waves is increased for both cases.

It may be assumed that the motion of the WEC-shell is sinusoidal, as is the forcing of the wave. The relationship between the phase of the WEC-shell and the wave force is such that when the WEC-shell reaches its maximum displacement from its neutral position and begins to be forced towards the zero-displacement position, the wave force is acting in such a manner as to accelerate the WEC-shell towards the zero-displacement position. In "prior art" systems, the WEC-shell is allowed to accelerate towards the zero-displacement position and its PTO absorbs some of the mechanical energy of the WEC.

In contrast thereto, in systems embodying the invention, the displacement and velocity of the WEC-shell are increased to produce more energy (power). By way of example, in the case of weak positional restoring forces (see FIG. 13), as the shell moves in one direction (e.g., up) and reaches its maximum (e.g., positive) displacement from neutral, its velocity goes towards zero. The point (e.g., $t_4$ in FIG. 13) at which the displacement and velocity of the shell becomes zero (and first begins to increase) is sensed and power is then applied to the shell (or the shaft) to increase its displacement, speed and acceleration. Power is applied to the shell via the PTO (and/or any suitable power supplying device—PSD) which imparts energy to the WEC—shell instead of absorbing energy from the WEC. Depending on the design of the system and the system requirements, power may be applied for a longer or shorter time interval. This procedure is repeated when the shell moves in the opposite direction (e.g., down) and reaches its maximum (e.g., negative) displacement (e.g., t=6 in FIG. 13). That is, the system senses the velocity of the shell as it decreases and goes to zero, and also senses the point (and time) at which the shell has reached maximum displacement and just starts to accelerate in the opposite direction. The AIMS system then gives the WEC a boost by supplying energy (power) to the shell via the PTO (and/or any suitable power supplying device—PSD). This procedure has the effect of increasing the displacement of the WEC-shell (compared to the prior art) and substantially increasing the velocity (and acceleration) of the WEC-shell. As the WEC-shell velocity and acceleration increase, the mechanical wave power absorbed by the WEC-shell (and the energy subsequently imparted by the WEC-shell to its PTO) increases dramatically. The dramatic increase in power absorbed by the WEC may then be made available to the PTO which can absorb the increased power and convert it to produce an increased electrical energy output. It should be appreciated that the power infusion is intended to cause the WEC to resonate and/or oscillate, resulting in a more efficient operation.

Thus, once the WEC-shell has reached a certain position, velocity, and/or acceleration, the PTO is used to absorb the mechanical energy from the WEC and to convert it into electrical energy. In AIMS systems and method embodying the invention, the PTO absorbs energy for a shorter amount of time than in prior art systems, but, there is much more energy to absorb.

Figure 12:
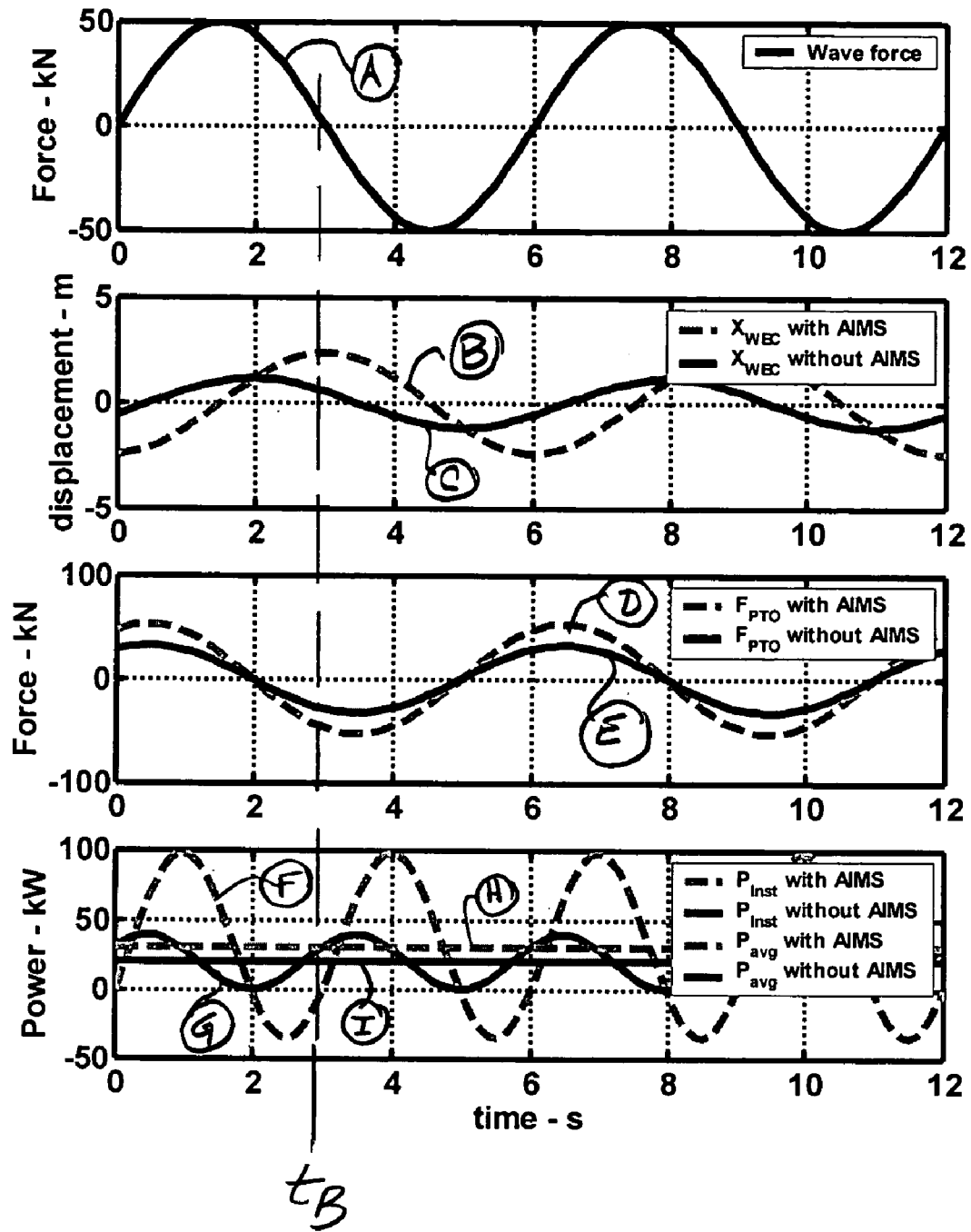
FIG. 12 is a diagram of idealized waveforms associated with the operation of a WEC, with "strong" restoring positional forces, in accordance with the invention and in comparison to the prior art.

The AIMS apparatus and method also improves power conversion efficiency when the WEC has strong positional restoring forces. An AIMS-controlled PTO improves on the prior art method by imparting energy to the WEC during portions of each wave cycle, thus increasing the maximum displacement, and hence velocity of the WEC, which makes for increased wave power absorption by the WEC-shell. For the case of the WEC exhibiting strong positional restoring forces, its PTO imparts energy to the WEC-shell as the shell approaches its maximum displacement. For example, as shown in FIG. 12, the shell reaches its maximum displacement at time tB, but power is applied to the WEC-shell before that time. This has the effect of delaying the instant (extending the time) at which the WEC-shell reaches its maximum displacement. Because the WEC reaches its maximum displacement later in the wave cycle, the WEC reaches its peak velocity later. For this case, the AIMS apparatus and method, by controlling the timing when power is supplied to the WEC-shell, causes the peak of WEC-shell velocity to approximately coincide with the peak wave force. Because mechanical wave power absorbed by the WEC-shell is the product of the wave force and the WEC velocity, this leads to an increase in mechanical power absorption by the WEC, which leads to an increase in maximal WEC displacement. This increase in maximal WEC displacement in turn leads to increased WEC velocity, which leads to increased power absorption. Eventually, the absorbed power stops increasing with increased WEC velocity and stroke, due to damping effects, and the inability of the wave field to exert force on a quickly moving object. Thus, in systems embodying the invention, for the cases of "weak" and "strong" positional restoring forces, the maximum displacement and velocity (as well as the acceleration) of the WEC shell are increased leading to increased power absorption by the WEC.

To further explain the invention, reference is made to the waveforms shown in FIGS. 12 ("strong" restoring forces) and 13 ("weak" restoring forces). Assume that waveform A represents the force of the ocean waves applied to a WEC of the type shown in the figures (e.g., FIG. 11). Waveform B depicts the displacement of the WEC in response to the application of the AIMS invention to the system. Waveform C depicts the displacement of the WEC in accordance with the prior art. Note that in accordance with the invention, the displacement shown in Waveform B is significantly greater than the displacement seen in Waveform C. In systems embodying the invention, the larger displacements (at the two ends of the excursion of the WEC-shell) are obtained by imparting energy to the WEC at, or near, the top end and the bottom end of the travel of the WEC-shell, when the velocity of the shell is going towards zero, just reaches zero and/or passes zero). Concurrent with the greater displacement is a significant increase in the velocity of the WEC-shell as it goes from one end of its travel to the other end of its travel. There is also a benefit due to the favorable shift in phase resulting in a still greater gain in power. (As above, it is assumed that the shaft is fixed while the shell moves up and down relative to the shaft. This is done for ease of description only. In the description and in the appended claims, it should be understood that the shell may be fixed while the shaft moves relative to the shell and/or that the shaft and shell may both move relative to each other.)

The top portion of FIG. 12 (waveform A) represents the force of the wave on the WEC. The second portion of FIG. 12 (waveforms B and C) represents the displacement of the WEC from the "rest" position. The third portion of FIG. 12 (waveforms D and E) represents the force ($F_{PTO}$) of the power take-off device (PTO). The fourth portion of FIG. 12 (waveforms F, H, G, I) represents the instantaneous power and average power absorbed by the PTO. Waveforms F and G represent instantaneous power and waveforms H and I the average power. The net gain in power using the invention may be seen by comparing waveforms H and I, where H is clearly more positive than I.

Figure 13:
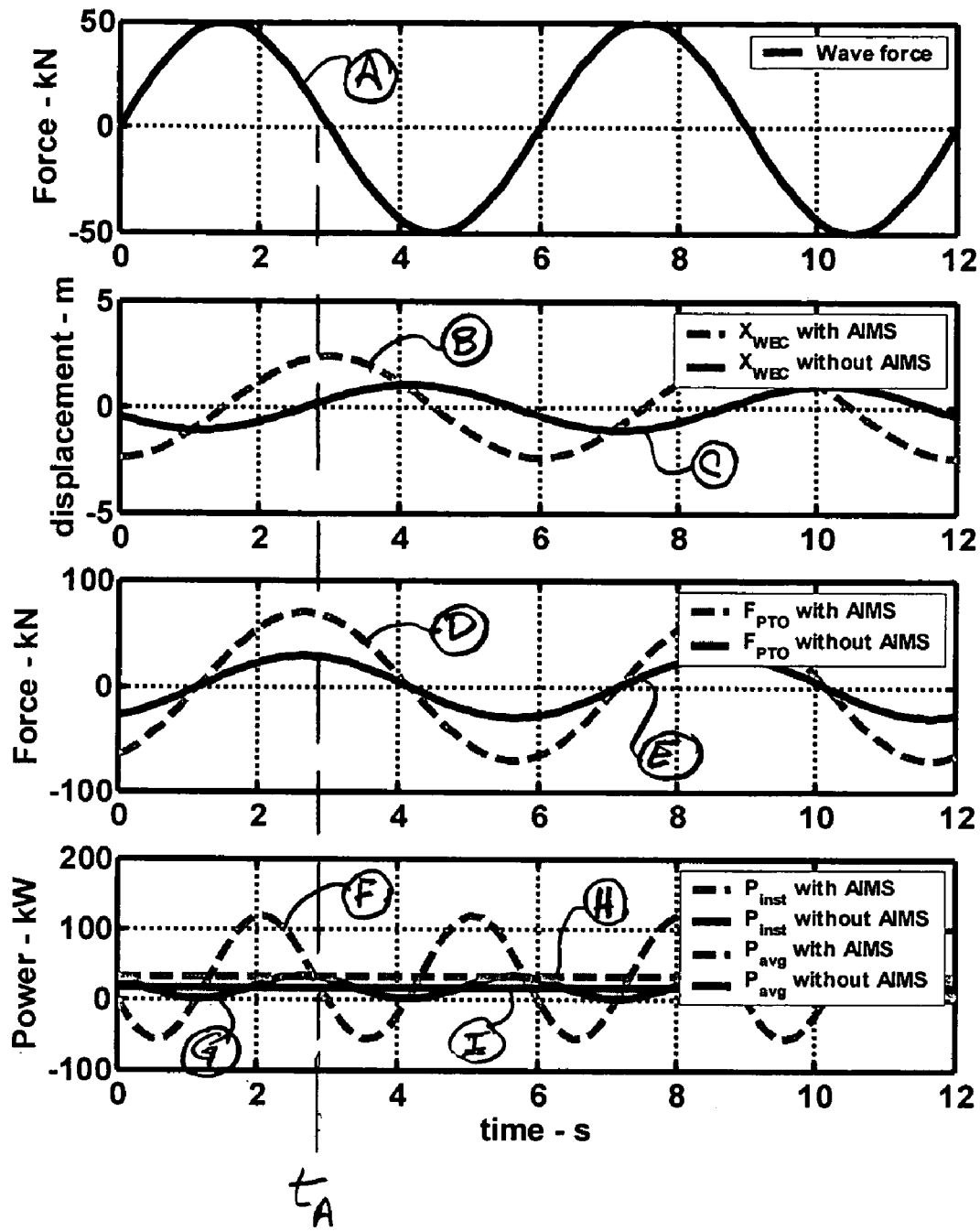
FIG. 13 is a diagram of idealized waveforms associated with the operation of a WEC, with "weak" restoring positional forces, in accordance with the invention and in comparison to the prior art.

The waveforms of FIGS. 12 and 13 demonstrate the benefits of the proposed AIMS apparatus and method when compared to the prior art. The graph of instantaneous power (waveform F) absorbed by the PTO indicates that the absorbed power is at times negative. Negative absorbed power implies positive imparted power, which means that the PTO is acting as a (PSD) motor (i.e., is using previously generated or external power to drive the WEC). Referring to FIG. 12, the operation may be briefly described as follows: Starting at t=0 seconds, the WEC has reached its largest negative displacement from its rest position. At this time, the PTO begins to impart energy (i.e. the PTO acts to accelerate the WEC) to it, thus driving it upwards. In the example, at approximately 1.5 seconds, the WEC passes through its rest point, and PTO begins to draw energy from the WEC (i.e. the PTO acts to decelerate the WEC.) Note that at this point, the velocity of the WEC is large relative to the non-AIMS case. The PTO continues to draw energy from the WEC until the WEC reaches its maximum extent at approximately 3 seconds. In this embodiment of the AIMS method, the net power absorbed by the PTO is shown by the horizontal dashed line in the figure. Note that the range over which the PTO draws power from the WEC-shell may be controlled and/or varied.

This method of imparting energy to the buoy just after it has reached its maximum extent has the effect of sending it slightly past its next "natural" turning point, thus changing the phase relationship between wave force and WEC motion. When properly implemented and executed, this change in phase relationship provides a benefit for power conversion by aligning the wave force with the velocity of the WEC. Note, that in FIG. 12, the maxima in the magnitude of the wave force occur at 1.5 seconds, 4.5 seconds, 7.5 seconds etc. This coincides with the velocity maximum of the WEC system with the AIMS apparatus, but not for the WEC system without the AIMS apparatus. Clearly, in accordance with the invention, the displacement of the shell in the up direction will be greater than it would be in the standard, prior art, scheme; and, likewise, the displacement of the shell in the downward direction extends significantly below the bottom for the standard (non-AIMS case). By way of example, in FIG. 12, the shell subjected to the AIMS process is displaced approximately 5 units during the time the shell (without AIMS) is displaced 2 units, which for this case indicates that the velocity of the shell has more than doubled.

As explained above, the efficiency of a WEC can be significantly increased by selectively adjusting the system spring ($\alpha$) and load damping ($\beta_{load}$) characteristics to match the wave conditions. Apparatus to perform this tuning is illustrated in FIGS. 7A, 7B, 7C, 8, 11 and 11A. The system spring constant corresponds to displacement of the WEC (e.g., shell) and the load damping constant corresponds to the power taken by the PTO from the WEC (and converted to useful electric energy). In accordance with the invention, the system spring constant may be adjusted by selectively supplying power to the WEC.

In the basic Active Impedance Matching System (AIMS), the output current of the PTO (assumed to be a generator for ease of description) is controlled such that the shell (assumed, for purpose of example, to be the moving member) is put in resonance with the waves. Assuming the PTO to normally function as a generator, the AIMS system requires that the generator also act as a motor for portions of each wave cycle and as a generator for other portions of each wave cycle. Useful or output electrical energy is generated during most of the wave cycle (when the PTO functions as a generator) and is stored. Some stored (or external) energy is returned to the system during the "motoring" portions of the wave cycle. The AIMS system includes a four-quadrant power converter, capacitors, various sensors, and computer-based control algorithms as shown in the figures In FIGS. 7A, 7B and 7C there is shown an embedded processor or control computer 700 which continuously samples various sensors, including WEC-shell, position and speed and/or acceleration. An algorithm residing in this control computer 700 determines generator current set-point commands that are continuously sent to a four-quadrant power converter, 702. This converter 702 can either load the generator or drive the generator so it functions like a motor (i.e. apply positive or negative current load as determined by the control computer).

A "four-quadrant converter" allows positive or negative torque (or force) to be applied to a motor/generator while the motor/generator is either accelerating or decelerating. Thus, it is possible with a four-quadrant converter to have the following four conditions: 1) positive torque (torque for a rotary electric generator or force for a linear electric generator) with positive speed, 2) positive torque (force) with negative speed, 3) negative torque (force) with positive speed, and 4) negative torque (force) with negative speed.

In the case of a system with a linear electric motor/generator (e.g., a LEG), force is the controlled parameter, and is approximately proportional to the generator current. In the case of a system with a rotary motor/generator, torque is the controlled parameter which is approximately proportional to generator current. The term "motor/generator" is used here because the electromechanical machine can function in either mode, depending on the polarity of the torque (force) and the speed.

Figure 7A:
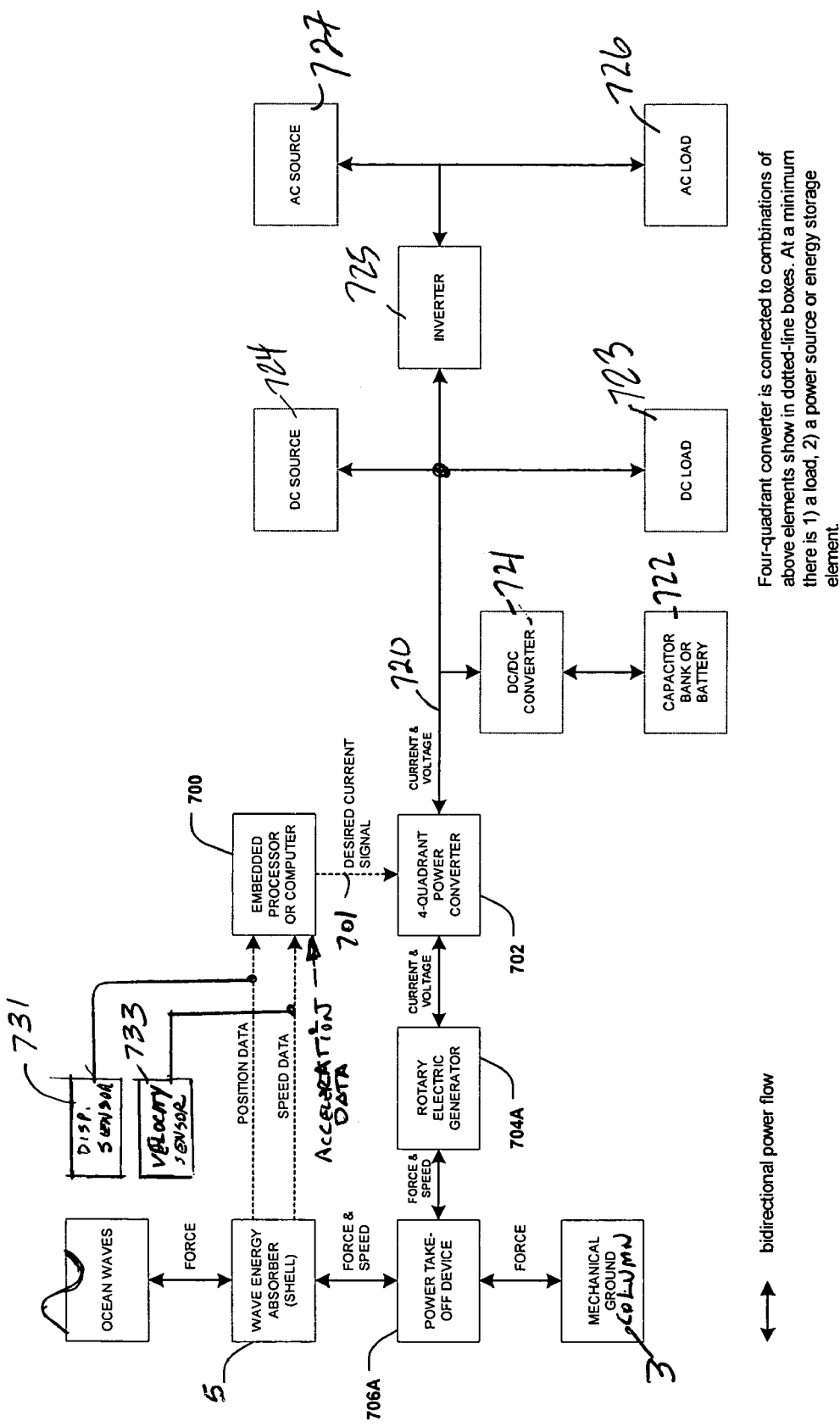
FIGS. 7A, 7B and 7C illustrate key elements of AIMS systems used to practice the invention.

In FIG. 7A, a power take off device (PTO) 706A is shown connected between a shell 5 of the WEC and its column or shaft 3, which is assumed to be mechanically grounded. The PTO 706A may be any type of electric generator/motor or any type of mechanical or hydraulic device such as, for example, a rack and pinion geared arrangement, a ball and screw arrangement, a hydraulic cylinder, a hydraulic motor, and/or any apparatus which can convert the mechanical motion between the shell and the shaft into electrical energy.

The PTO is shown connected to a rotary electric generator/motor 704A which is connected to a 4 quadrant power converter 702. In FIG. 7A there is shown a computer or embedded microprocessor 700 to which is applied: (a) data pertaining to the position of the shell relative to the shaft; and (b) data pertaining to the speed of the shell relative to the shaft. Acceleration data may also be supplied or be determined by the computer. The computer 700 is programmed to produce desired current signals 701 which are applied to the power converter 702, in response to predetermined or programmed condition of speed, displacement and other criteria (e.g., acceleration) set into the computer.

The primary aim of the system is to have the PTO 706A and the generator 704A convert the wave energy absorbed by the WEC-shell into electromechanical energy and to produce, as efficiently as possible, an output voltage and current at the output 720 of the power converter 702. The output 720 of the power converter 702 may be applied to a simple or complex load. The load may include: a) a DC/DC converter 721 coupled to a capacitor bank 722 (or battery) where the electrical energy is stored; and/or b) a DC load 723 and a DC source 724; and/or c) an inverter 725 to generate an AC power signal (whose frequency and amplitude is controlled) which can be applied to an AC load 726 or an AC source 727.

In systems embodying the invention, during certain portions of the ocean wave cycle, under the control of computer 700, power from the system is supplied via the converter 702 to the generator/motor 704A which then drives the PTO 706A such that energy (power) is supplied to the shell to cause it to move in a direction which will produce an over all power gain. That is, by using energy from the system to drive the shell and by controlling the time and manner in which the energy is supplied to the WEC-shell, more useful energy is obtained from the waves and the system than in the prior art.

The position data signal shown in FIG. 7A may be a current command component which is a function of the displacement of the WEC shell. This component represents a "spring" characteristic. A large displacement of the WEC shell from a null position results in a large current and a resultant generator force to return the WEC shell to the null point. The speed data signal is another current command component which represents a "resistive" or damping characteristic. A high WEC shell speed results in a high generator voltage. The generator current, as determined by the control algorithm and four-quadrant power converter is high in this case. Thus, the programmed generator current consists of a real and reactive component.

As shown in FIG. 7A, an AC power generated by the PTO 706A and the rotary electric generator 704A may be converted to DC by the four-quadrant pulse-width-modulated converter 702 The DC output current of this four-quadrant converter is primarily DC with a variable component that follows the power of the generator. The DC component is proportional to the average power out of the four-quadrant converter. To keep the power to the load positive and steady, power from the generator controller is fed to a DC bus supported by one or more banks of capacitors (or some other energy storage device). The capacitors store energy when the generator output exceeds the inverter demand and release energy when the generator output is below the inverter demand. The inverter demand is slowly changed to maintain energy balance of the capacitors.

This system requires some energy to be fed back into the wave energy converter during a portion of each wave cycle. As described above, this energy can be that which has been stored in capacitors. For applications where wave energy power is fed into a utility power grid, the energy to be fed back into the wave energy converter can be supplied by the utility power grid. The net average power to the utility power grid will be positive.

Figure 7B:
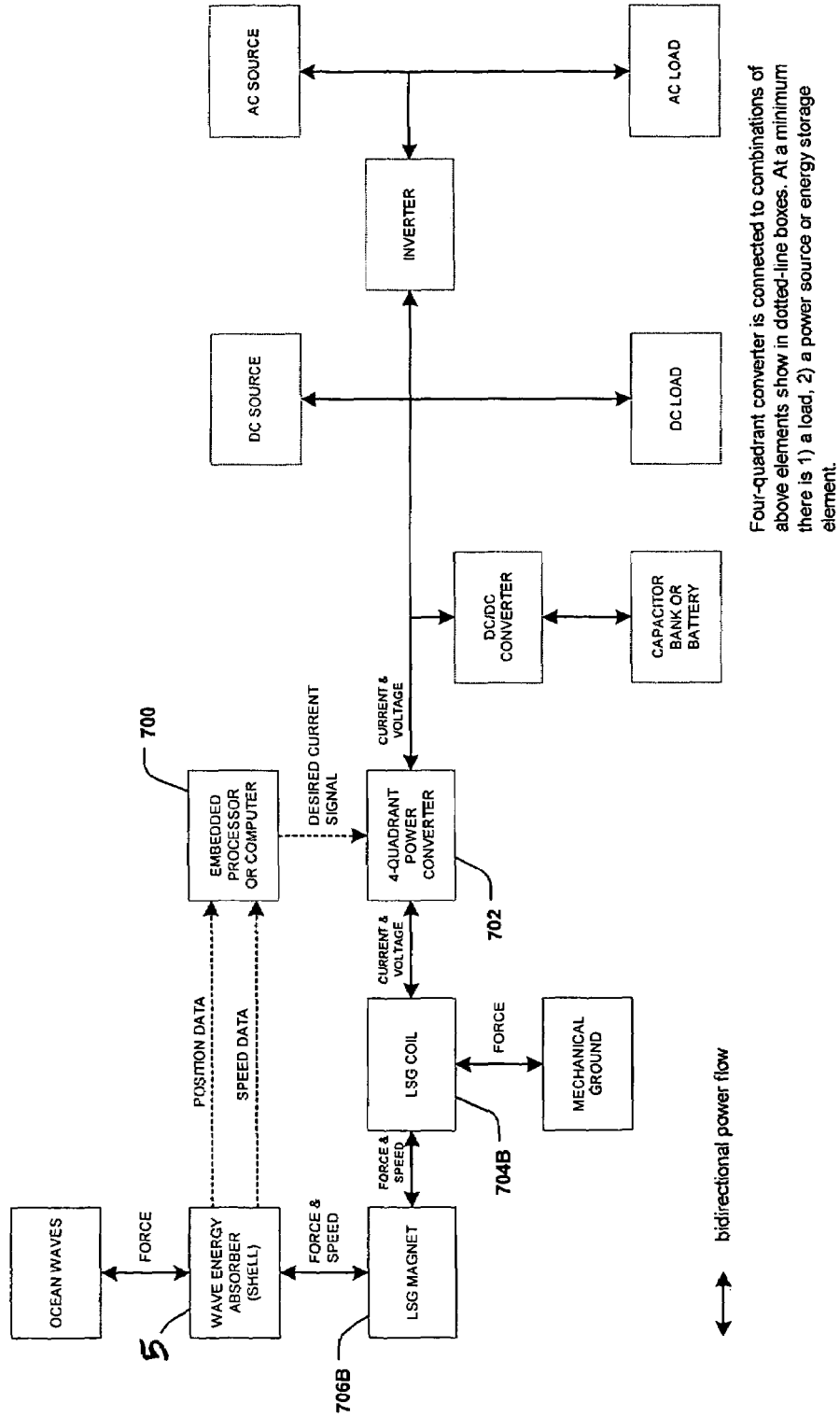

FIG. 7B is generally similar to FIG. 7A, except for the power take off device which is shown to include a permanent magnet assembly (PMA) 706B and an induction coils assembly (ICA) 704B to form a linear electric generator (LEG). In FIG. 7B, the coil assembly is shown to be mechanically grounded. This suggests that the PMA is connected to the moving shell 5, causing voltage and current to be produced across the coils of the ICA. The voltage and current generated by the coils is supplied to the 4-quadrant pulse width modulated power converter 702. As in FIG. 7A, the operation of the power converter 702 is controlled by computing device 700 which controls power extraction and the supplying of power in response to position and speed (and acceleration) data generated by movement of the shell relative to the shaft. Under the control of the computer, the converter 702 in turn determines when and how power is taken from the WEC-shell and when power is supplied to the WEC-shell. In FIG. 7B, power would be supplied to the coils or drawn from across the coils. The operation of the system is otherwise similar to that of FIG. 7A and need not be further detailed.

Figure 7C:
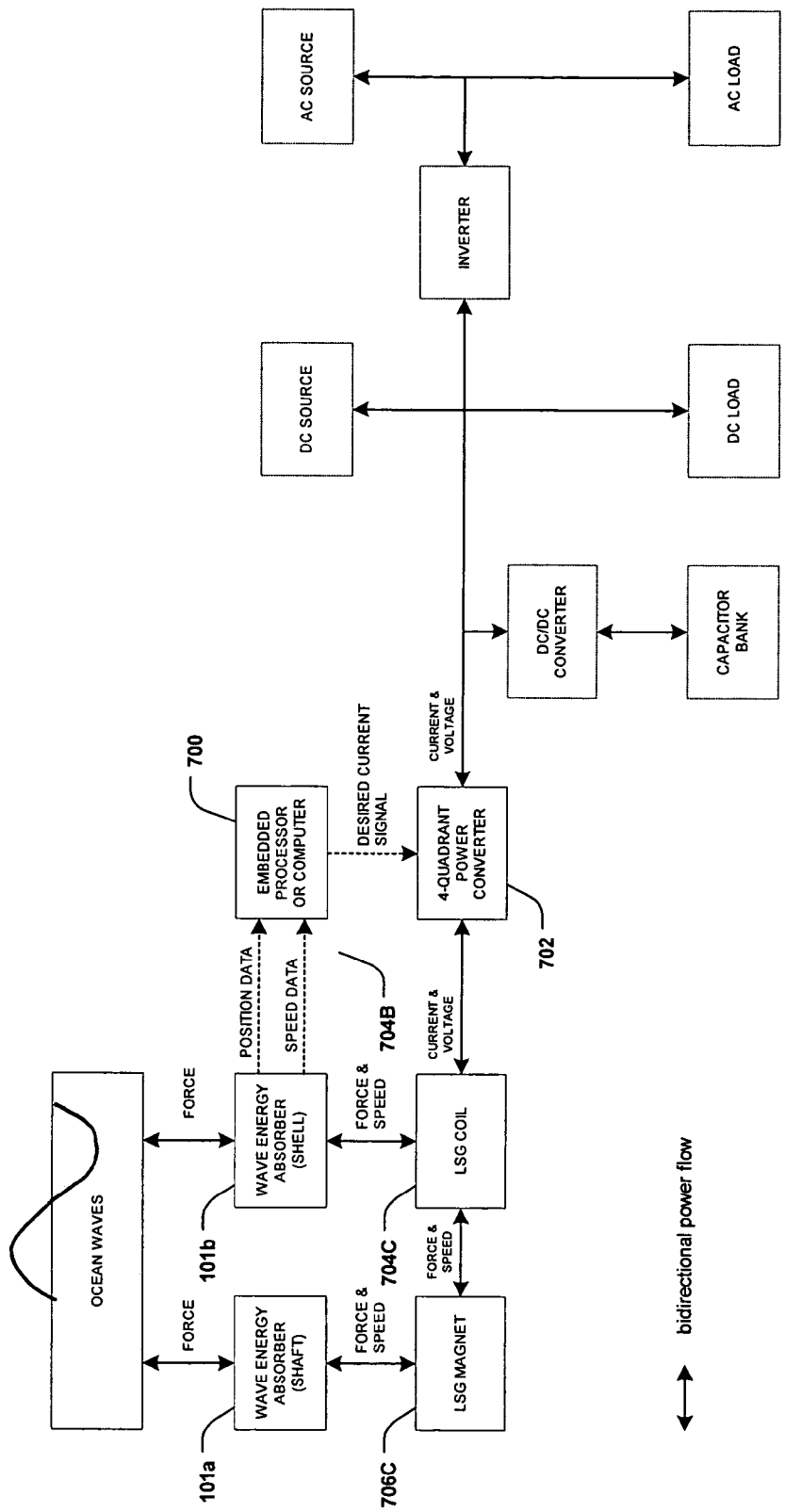

FIG. 7C is generally similar to FIG. 7B, except that in this configuration of the WEC both the shaft 101a and the shell 101b can move relative to each other.

Key elements of the AIMS system embodying the invention include the following:

1. WAVE ENERGY ABSORBER—This component (which may be formed by the combination of the shell and the shaft of the WEC) absorbs mechanical energy from ocean waves and applies a force to a power take-off device (PTO).
2. POWER TAKE-OFF DEVICE (PTO)—This component, typically connected between the shaft and the shell of the WEC, converts the linear force and motion of the wave energy absorber and converts it to an intermediate or final usable form of force and motion. For example, this component could be a hydraulic cylinder that converts linear force and motion to hydraulic fluid pressure and flow. This component could also be a device that translates linear force and motion to rotary torque and angular displacement. This component may also be a linear electric generator (LEG) attached to the shell and shaft and which can convert their relative motion to an AC voltage and current.
3. MECHANICAL-TO-ELECTRIC CONVERTER—This component converts mechanical linear force (or torque) and linear displacement (or angular displacement) to electric current and voltage, and vice versa. As an example, this component could be a permanent magnet generator that can also act as a motor.
4. MECHANICAL GROUND—refers to one part of the PTO (shell or shaft) held relatively stationary so that the PTO can be subjected to a force applied by the WAVE ENERGY ABSORBER. This component could be a long spar (shaft) anchored to the ocean floor.
5. FOUR-QUADRANT POWER CONVERTER—A "four-quadrant converter" is an electronic device that allows positive or negative torque (or force) to be applied to a motor or generator while the motor or generator is either accelerating or decelerating. Thus, it is possible with a four-quadrant converter to have the following four conditions: 1) positive torque (force) with positive speed, 2) positive torque (force) with negative speed, 3) negative torque (force) with positive speed, and 4) negative torque (force) with negative speed. In the case of a system with a linear motor/generator, force is the controlled parameter, and is approximately proportional to the generator current. In the case of a system with a rotary motor/generator, torque is the controlled parameter which is approximately proportional to generator current. The term "motor/generator" is used here because the electromechanical machine can function in either mode, depending on the polarity of the torque (force) and the speed. The four-quadrant converter is generally a pulse-width-modulated (PWM) device comprised of a number of solid-state switches and energy storage components. The duty-cycle of the solid-state switches is controlled in a manner to regulate the current flow into and out of the motor/generator.
6. CAPACITOR BANK (722)—functions to store electric energy during the generator portion of the wave cycle and to release electric energy during the motor portion of the wave cycle. The capacitor bank can either be connected directly to the DC bus connected to the FOUR-QUADRANT CONVERTER or fed to the DC bus via a bidirectional power converter.
7. BIDIRECTIONAL DC/DC CONVERTER—regulates the flow of electric energy into and out of the CAPACITOR BANK. The flow of energy can be controlled so as to maintain a steady DC bus voltage or maintain the state of charge of the capacitor bank.
8. INVERTER (725)—may be a pulse-width-modulated device that converts DC power to highly regulated AC power. If desired, this device can be bidirectional so that AC power can be converted to DC power that can feed the four-quadrant converter and back-drive the electric generator (i.e. the mechanical-to-electric converter).
9. DC LOAD (723)—is the end user of the power generated by the wave energy converter in certain applications.
10. DC SOURCE (724)—may be a source of power that is fed back to the generator via the electric generator. This component would generally not be required for systems connected to and supplying power to a utility power grid.
11. AC LOAD (726)—is the end user or users of the power generated by the wave energy converter in certain applications.
12. AC SOURCE (727)—is the source of AC power in an AC power system application.
13. DISPLACEMENT (731) AND/OR VELOCITY (733) SENSORS Displacement sensors (e.g., 731 in FIG. 7A) sense the displacement of the wave energy absorber in relation to the mechanical ground or, in the case of a dual absorber system, senses the relative displacement of the two wave energy absorbing elements. A separate velocity sensor (e.g., 733 in FIG. 7A) can sense the relative velocity of the wave energy absorber in relation to the mechanical ground or, in the case of a dual absorber system, senses the relative velocity of the two wave energy absorbing elements.
14. EMBEDDED PROCESSOR OR COMPUTER (e.g., 201, 700 and 81)—is a computational device that receives data inputs from various sensors, receives parameter and/or operating mode inputs from a system operator, and transmits outputs to the four-quadrant converter. The output includes a signal that adjusts the four-quadrant converter AC current set point. The computation device (e.g., 700 in FIG. 7A) may be programmed and used to control when and how power is extracted from the WEC and when power is supplied to the WEC.
15. PROCESSOR FOR CONTROL ALGORITHMS—

This component (which may be part of the computer) receives data that indicates the relative displacement of the wave energy absorber and mechanical ground, or in the case of a dual-absorber system, receives data that indicates the relative displacement between the two wave energy absorbing elements. The algorithm can compute the time derivative of this relative displacement to determine the relative velocity between the wave energy absorber and mechanical ground or between two wave energy absorbing elements. Alternatively, the velocity can be supplied to the control algorithm by a velocity sensor. In addition, the algorithm can calculate the time derivative of velocity to determine the acceleration of the shell or shaft.

This component may be used to determine a desired value for motor/generator current ($I_{GENSET}$) as a function of wave energy absorber(s) displacement and velocity. This current is a function of the displacement (x) of the wave energy absorber from a neutral position ($x_0$). As the wave energy absorber displacement from the neutral position ($x-x_0$) increases, so does the "spring" component of the desired motor/generator current ($I_{GENSET}$). The desired value of motor/generator current is also a function of wave energy absorber velocity. As the wave energy absorber velocity increases, so does the "damping" component of the desired motor/generator current. The desired motor/generator current is the algebraic sum of the spring and damping component:

$$I_{GENSET} = \alpha(x-x_0) + \beta x' + \mu x$$

Where: $\alpha$ is the spring constant that relates desired generator current to wave energy absorber linear displacement relative to a desired neutral point ($x-x_0$), $\beta$ is the damping constant that relates desired motor/generator current to wave energy absorber speed (x'), $\mu$ is the mass constant that relates desired motor/generator current to wave absorber acceleration (x"), x is the linear displacement of the wave energy absorber, $x_0$ is the desired wave energy absorber neutral (or null) point, x' is the time derivative of the linear displacement (i.e. velocity) and x" is the time derivative of the linear velocity. This desired value for motor/generator current is converted to an electric signal that can be received by the four-quadrant converter.

Figure 8:
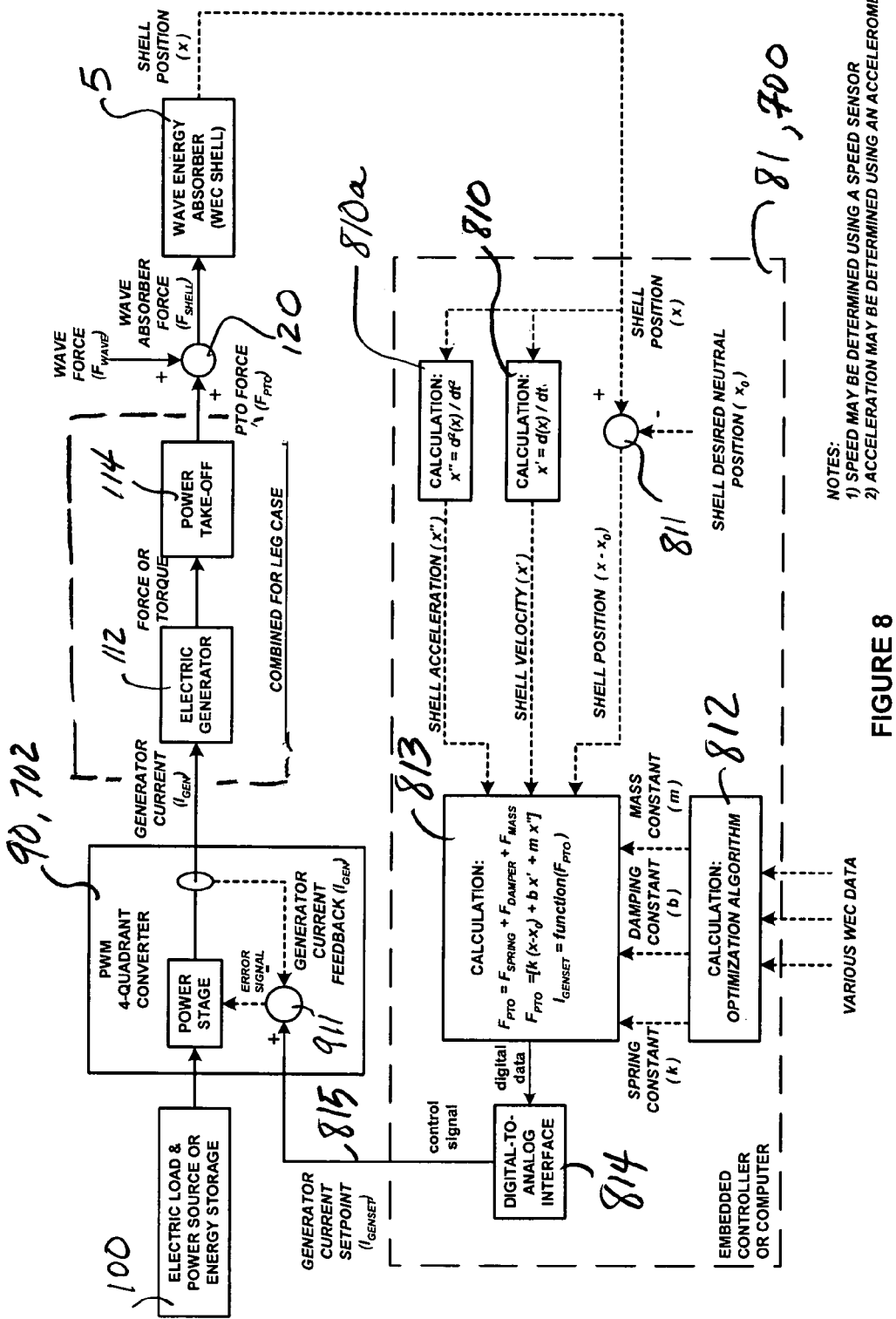
FIG. 8 is a block diagram of an AIMS control system used to practice the invention.

Referring to FIG. 8 (and FIG. 11), there is shown a wave energy absorber (WEC shell) 5. A force Fwave is applied to the shell 5 causing it to move. The position or displacement (x) of the shell 5 may be sensed or measured (e.g., via sensors 731) as the shell moves relative to the shaft 3 (not shown). The displacement may be expressed as a function of a null position $x_0$, with the shell moving up and down relative to the null position. The velocity (v) of the shell may be calculated (module 810) by determining dx/dt or by using a speed sensor. The acceleration ("a") of the shell may be calculated (module 810a) by determining dv/dt or by using an acceleration sensor. The shell displacement, the velocity, and acceleration are supplied to an embedded controller or computer 81 (which may be equivalent to computer 700 of FIG. 7A). The computer 81 is shown to include data processing section 810 for calculating the shell velocity (if an independent sensor for performing this function is not used). The computer 81 is also shown to include a processing section 811 for determining the offset of the shell relative to the null position ($x_0$) to produce a signal referred to as the shell position error ($x-x_0$). The computer 81 is also shown to include a data base and processor section 812 into which various parameters such as the mass and volume and the displacement of the WEC can be supplied (and stored) to generate: (a) a term representing the spring constant (k) of the WEC; and (b) a term representing the damping constant (b) of the WEC. Note that the spring constant (k) represents and is a function of the forces tending to return the shell to its null position and is position dependent. Note also that the damping constant (b) represents and is a function of power taken out of the system and system losses and is speed dependent. The computer 812 is also shown to include a processor section 813 to which the following signals are supplied: (a) spring constant ($\alpha$), (b) damping constant ($\beta$); (c) mass constant ($\mu$), (d) the shell velocity (v), (e) shell neutral position ($x_0$) and (f) the shell position error signal ($x-x_0$).

The processor 813 is programmed to calculate the force, referred to as $F_{PTO}$. The application of this force may require that power be supplied to the WEC. However the net effect of its application is that it tends to optimize the response of the WEC and to increase the net power produced by the WEC and hence its efficiency. The processor determines $F_{SPRING}$, $F_{DAMPER}$ and $F_{MASS}$ which when summed equal $F_{PTO}$ which, as shown in FIG. 8 may also be expressed as:

$$F_{PTO} = F_{SPRING} + F_{DAMPER} + F_{MASS} = \alpha(x-x_0) + \beta x' + \mu x''. \quad \text{Eq. A}$$

The processor 813 is also programmed to supply digital data to a digital to analog interface circuit 814 to produce a generator current set point signal referred to as $I_{GENSET}$ which is a function of $F_{PTO}$. The digital signal $I_{GENSET}$ is applied to an input of a 4-quadrant power converter 90 (which may be like converter 702 of FIG. 7A). The 4-quadrant power converter 90 is shown connected between block 90 and block 110. Block 100 may include the load driven by the WEC and/or a power supply charged by the WEC and or a supply for storing energy which may be used to provide a current to the PTO 114. FIG. 8 shows a generator current IGEN produced by the power converter 90 which is applied to a generator 112 (which when driven functions like a motor) so a to apply a force or a torque to a power take off device 114 to produce a desired PTO force ($F_{PTO}$), which is shown to be summed (symbolically in summer 120) to produce the net force applied to the shell 5. It should be appreciated that the power converter controls the current of the generator to produce the desired PTO force ($F_{PTO}$).

Characteristics of $F_{PTO}$ used in practicing the invention.
$F_{PTO}$ is positive if $\alpha x + \beta x' + \mu x'' > 0$
$F_{PTO}$ is negative if $\alpha x + \beta x' + \mu x'' < 0$ Ignoring the $\mu$ and x" part, it can be seen that the PTO force can be positive when the WEC is above or below the neutral point. It all depends on the sum of the $\alpha x$ and $\beta x'$ computations. For example, there are two cases when the WEC is above the neutral point. In one case, the speed is in a direction which results in a force that supports the spring force. In the other case the speed is in a direction which results in a force that opposes the spring force. Therefore, it is necessary to compute $\alpha x + \beta x'$.

In calculating the optimizing algorithm, the calculations may include the steps of determining the frequency (f) of the waves impacting the WEC, where $\omega = 2\pi(f)$; determining the mass (M) of the WEC; determining the hydrostatic restoring factor (k); determining the spring force of the WEC (b-damping); and defining $\alpha = [M(\omega^2)] - k$; defining $\beta = b$-damping; (c) determining the position X; determining the velocity v (where v=dx/dt) and calculating the desired force F(pto)=$\alpha x + \beta v$; and applying F to WEC.

Figure 9:
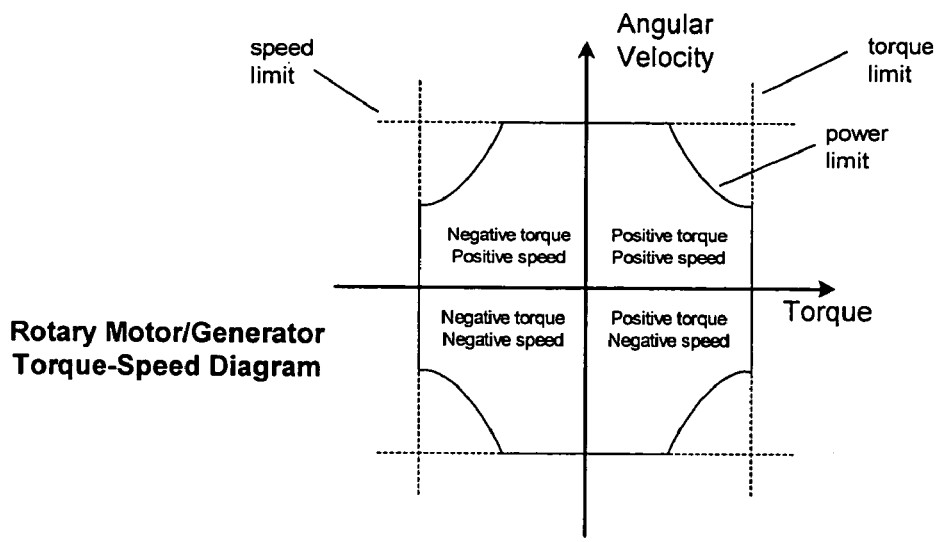
FIG. 9 is a diagram depicting the functions performed by a 4-quadrant power converter used in practicing the invention.
Figure 9:
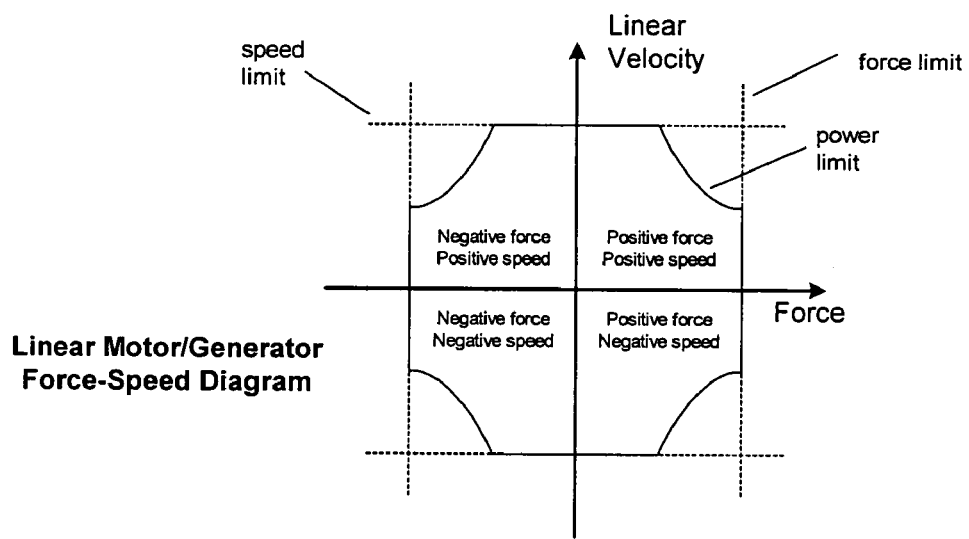

FIG. 9 illustrates the functions performed by the 4-quadrant power converter 90 (702 in FIG. 7A). The function of the power converter 90 is conceptually similar for (a) the case of a rotary motor/generator used in conjunction with, or as, the power take off device, or (b) the case of linear motor/generator used in conjunction with, or as, the power take off device. However, in the case of the rotary motor/generator due to the rotation of the motor/generator the torque-speed graph is in terms of angular velocity (shown along the Y-axis) and torque (shown along the abscissa) and the 4 quadrants may be described as follows: (a) negative torque, positive speed; (b) positive torque, positive speed; (c) positive torque, negative speed; and (d) negative torque, negative speed. For the case of the linear motor/generator the force speed diagram shows the Linear Velocity along the Y axis and the Force along the X-axis and the 4 quadrants may be described as follows: (a) negative force, positive speed; (b) positive force, positive speed; (c) positive force, negative speed; and (d) negative force, negative speed.

Figure 10:
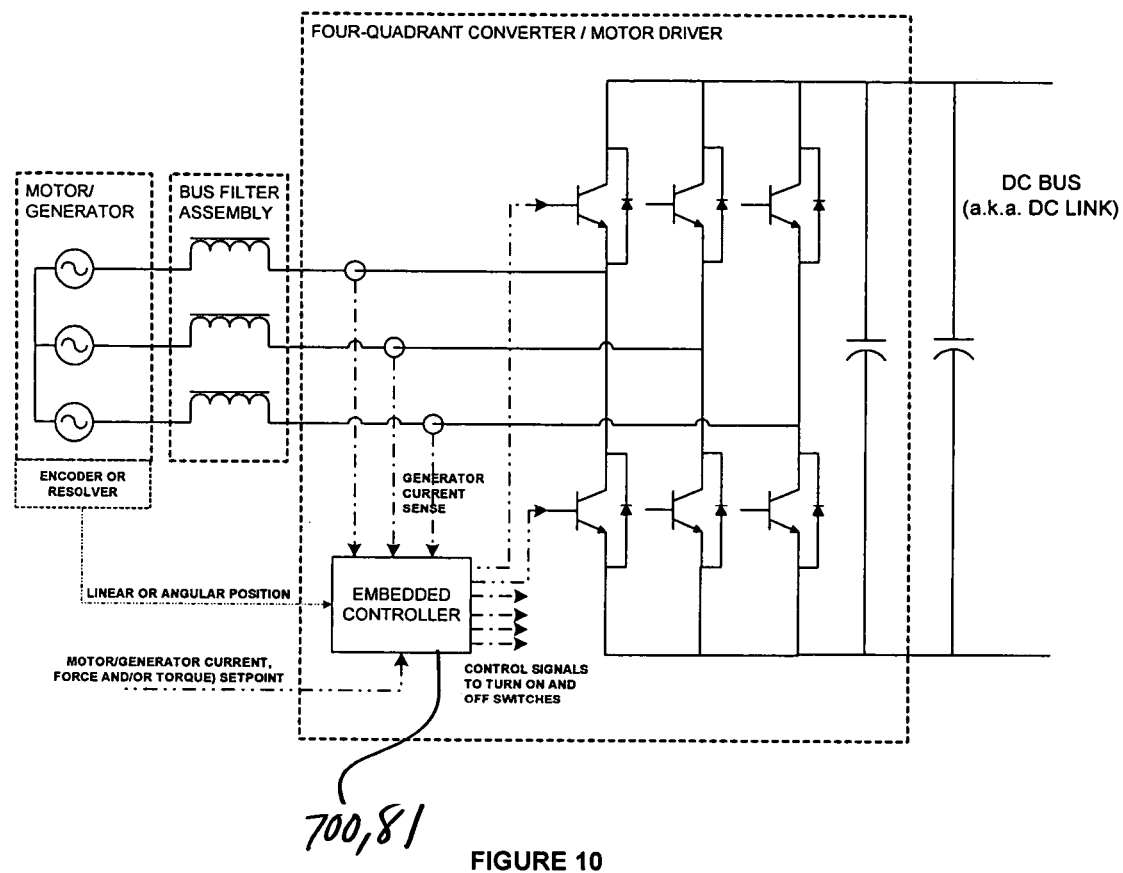
FIG. 10 is a diagram of a portion of the electronics of a power converter.

FIG. 10 is a schematic diagram of part of the 4-quadrant converter illustrating that output currents produced by the generator are sensed and the sensed signals are supplied to a computing device (700, 81). The computing device supplies turn-on and turn-off signals to the switches T1-T6, shown in the figure. FIG. 10 shows one embodiment of a four-quadrant power converter used to control the current and torque of a three-phase brushless DC rotary motor/generator or the current and force of a three-phase brushless DC linear electric motor/generator. In this example, a signal that reflects the desired generator current (or force or torque) is sent from the system controller (computer) to the four-quadrant converter. This set-point has been computed by the system controller and is a function of shell-spar position, speed and/or acceleration. Generator position signals are sent from a sensor (typically an encoder or resolver) to the four-quadrant converter. The four-quadrant converter has an embedded processor that receives these two sets of signals along with actual generator current and controls the six power switches (transistors in this example) to turn on and off at the appropriate time to achieve the desired current. As the set-point is continually updated and the actual motor/generator position is continually changing, the four-quadrant converter power switches are toggled on and off to achieve the desired motor//generator current.

Figure 11:
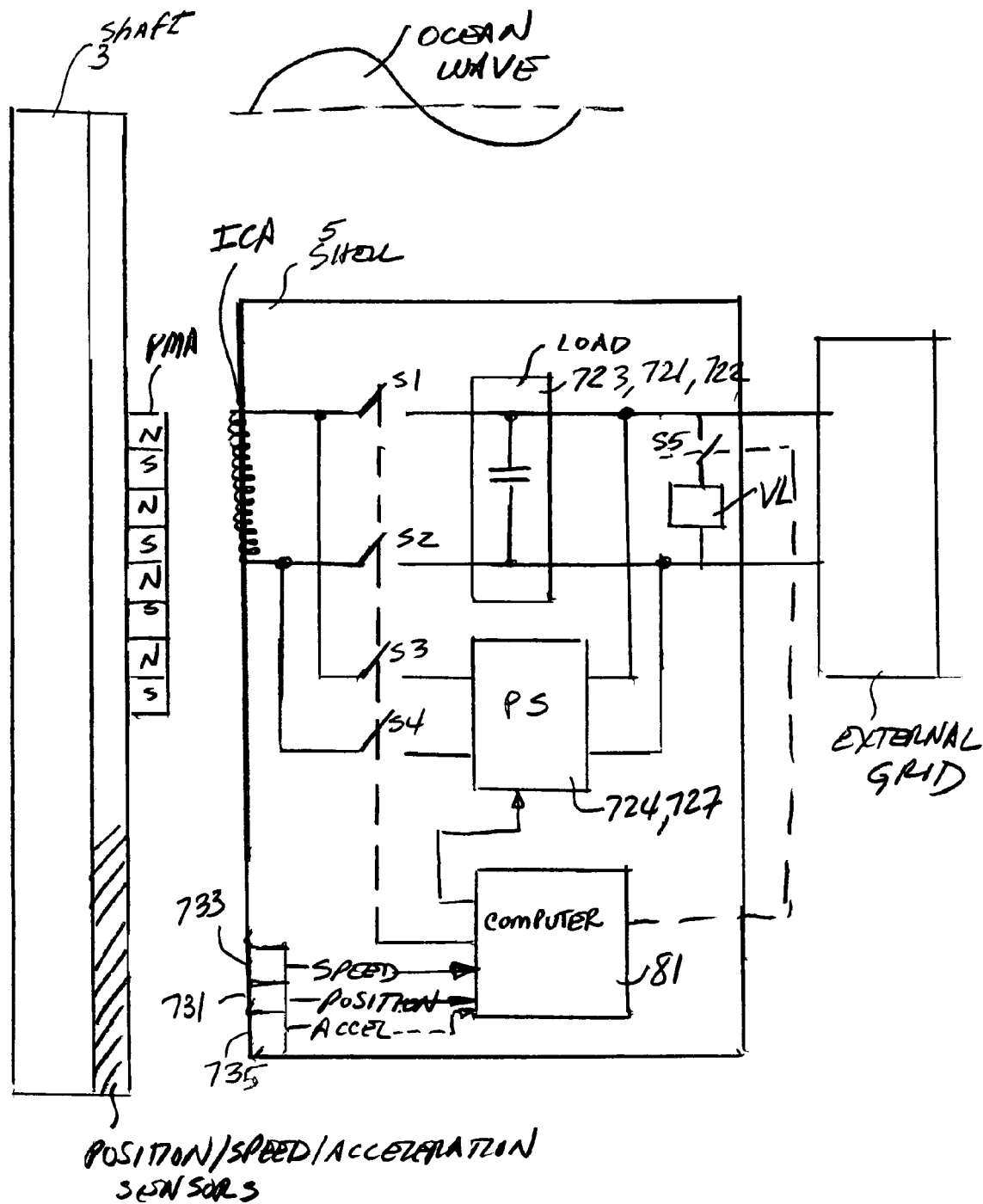
FIGS. 11 and 11A are highly simplified block diagrams of a system embodying the invention where the power take off device (PTO) is a linear electric generator (LEG)

FIG. 11 shows a LEG connected between the shaft and shell of a WEC. In this figure the PMA is connected/attached to the shaft and the induction coil assembly (ICA) is attached to the shell. In a typical application, as the shaft moves relative to the shell (or vice versa), voltages and currents generated across the coils of the ICA, in response to the relative motion, are fed via switches S1 and S2 to the load. Switches S1 and S2 may be controlled by computer 81. For ease of illustration assume that the load is a capacitor used to store the energy generated in the coils.

In FIG. 11, a power source (724, 727) is shown which is connected across the coils via switches S3 and S4. The turn on and turn off of these switches is controlled by controller computer 81. Note that there is a variable load (VL) coupled via switch S5 across the load. Switch S5 may also be controlled by computer 81. Power source 724,727, may be an independent power source or may be part of a power supply associated with the load which is charged up by the energy obtained from the coils of the ICA.

By controlling the switches S3 and S4 and the nature of the power supply 724, 727, currents and voltages can be applied across the coils to selectively feed back power to the shell/shaft and accomplish a degree of active impedance matching.

Controlling the switching of S1, S2, S3 and S4 allows: (a) energy to be extracted from the shell/shaft and to be supplied to the load; or (b) for energy to be supplied to the shell/shaft. The switches may be controlled in response to position, speed or acceleration signals applied to or developed by the computer. The computer may be used to control the opening and closing of the switches and the power from the supply such that positive or negative torque (or force) may be applied to the LEG (functioning as a motor or generator) and hence to the shaft and shell while the (motor or generator) shaft or shell is either accelerating or decelerating. Thus, it is possible to have the following four conditions: 1) positive torque (force) with positive speed, 2) positive torque (force) with negative speed, 3) negative torque (force) with positive speed, and 4) negative torque (force) with negative speed.

Figure 11A:
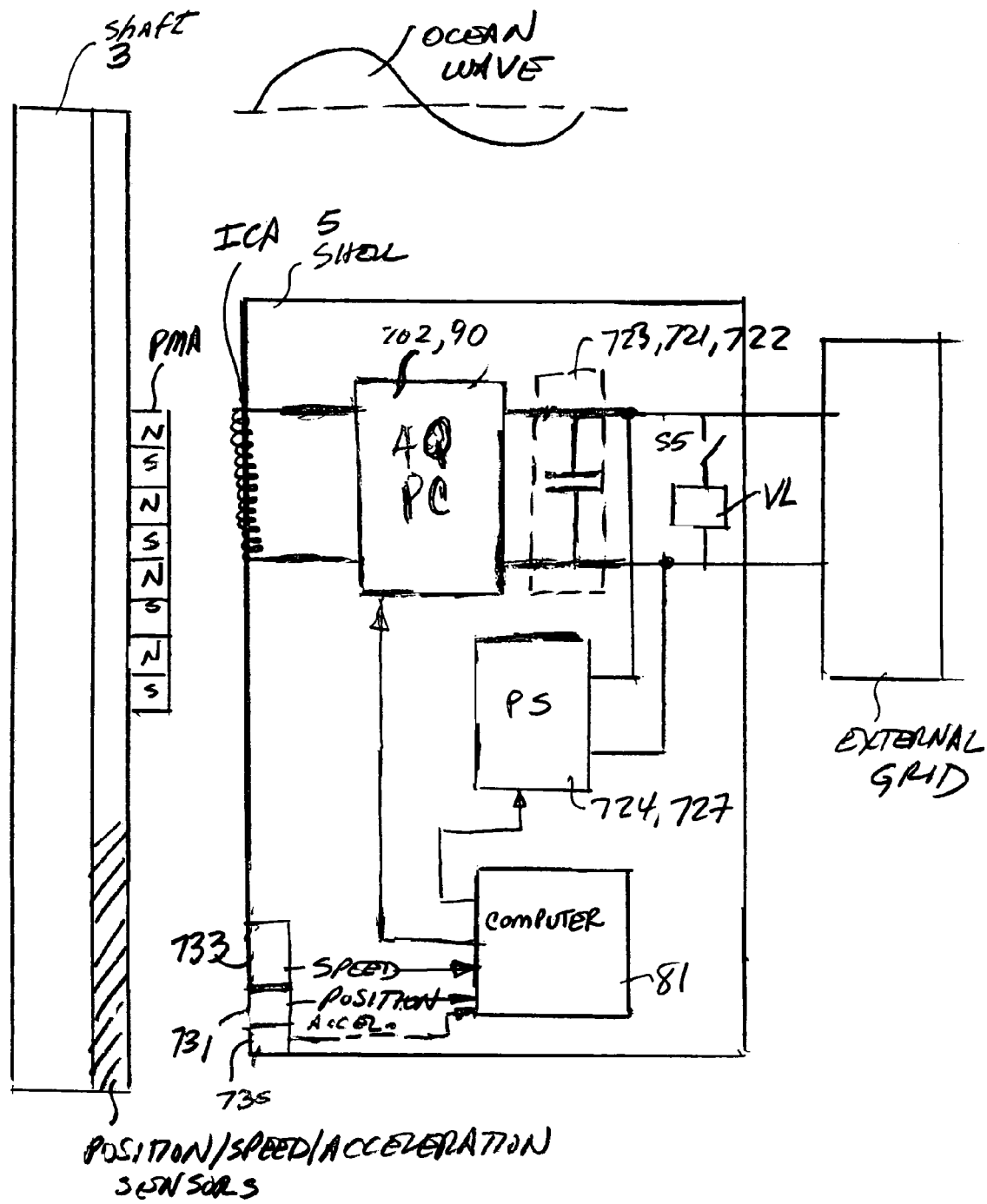

FIG. 11A also shows a LEG connected between the shaft and shell of a WEC. FIG. 11A shows that the output of the ICA is coupled to a 4-quadrant power converter (90, 702) whose output is connected the load (723, 721, 722) to supply the load when an electrical output is being extracted from the coil assembly. In response to position, speed, or acceleration signals, the computer 81 may generate signals applied to power converter 90 which enables the converter to then supply energy to the ICA to cause the shell to move relative to the shaft (or vice-versa).

It should be appreciated that Applicants' invention includes apparatus and methods for controlling the back-force of the PTO ($F_{PTO}$) in a way that increases the power generated by a WEC. The PTO may either be a linear electric generator (LEG) or a combination of a linear-rotary translator (e.g. rack and pinion) and a rotary generator. The $F_{PTO}$ of the PTO is controlled such that the $F_{PTO}$ is a function of shell position (relative to spar) and speed or shell position and shell acceleration. The position, speed and acceleration dependent backforces are controlled in a way to achieve "quasi-resonance" of the buoy (i.e. the PTO force combined with the WEC's natural mass and spring like behavior make the WEC system behave like a mass-spring-damper system in resonance with the predominant period of wave excitation incident on the WEC).

The $F_{PTO}$ which can be positive or negative may be expressed as:

$$F_{PTO} = \alpha \cdot x + \beta \cdot \dot{x} + \mu \cdot \ddot{x}$$

Where x is the shell-spar position relative to a desired "neutral" point $\dot{x}$ is the shell-spar speed $\ddot{x}$ is shell-spar, $\alpha$ is a spring coefficient $\beta$ is a damping coefficient and $\mu$ is a mass coefficient The parameters $\alpha$, $\beta$, and $\mu$ are chosen for the existing wave conditions in a way that optimizes capture of wave energy by the WEC. These parameters may be chosen by an operator and downloaded to a WEC control computer, or they may be determined by a WEC on-board computer using various alternative algorithms. A simple parameter selection approach is to determine the period of the predominant waves and select the parameters to achieve resonance for this wave period.

The PTO force exerted between the shell and spar may be obtained by one of the following:

1. a combination of a linear electric generator, a four-quadrant power converter that controls current to/from the generator, and a controller that continuously issues current (or force) set-point commands to the four-quadrant power converter with the desired goal of driving the PTO (i.e., the LEG in this case) to exert a force between the shell and spar that is a function of shell-spar position and speed, or shell-spar acceleration and speed.

2. a combination of a device that translates linear force and linear motion to rotary torque and rotary motion (e.g., rack and pinion; hydraulic ram with hydraulic motor), a rotary electric generator, a four-quadrant power converter that controls current to/from the generator, and a controller that continuously issues current (or torque) set-point commands to the four-quadrant power converter with the desired goal of driving the PTO to exert a force between the shell and spar that is a function of shell-spar position and speed, or shell-spar acceleration and speed.

The four-quadrant power converter can drive the linear (or rotary) electric generator to 1) exert positive force (or torque) when the generator speed is positive, 2) exert positive force (or torque) when the generator speed is negative, 3) exert negative force (or torque) when the generator speed is positive, and 4) exert negative force (or torque) when the generator speed is negative.

The four-quadrant power converter supplies power to and extracts power from a DC power bus to enable the generator and PTO to perform the desired force function. The DC bus may supply power to a DC load and/or an AC load via a DC/AC converter (inverter). The DC power may also be supplied to an energy storage device such as an electro-chemical battery or capacitor bank, either directly or via a DC/DC converter. The DC power bus may receive power from an electro-chemical battery or capacitor bank, either directly or via a DC/DC converter. The DC bus and four-quadrant converter may also receive power from an AC source via an AC/DC converter.

What is claimed is:

1. A combination comprising:
a wave energy converter (WEC) having two elements intended to be placed in a body of water, the two elements being able to move relative to each other in response to forces applied to the WEC by the body of water; at least one of the two elements being a wave energy absorber; and
means connected between the two elements for extracting energy from the WEC and for producing output electric energy as a function of the relative movement between the two elements; and
means connected between a source of energy and one of the two elements for sensing and determining selected ones of the displacement, velocity and acceleration of one of two elements relative to the other for selectively and actively supplying energy to one of the two elements for causing an increase in the displacement and velocity of one of the two elements relative to the other, whereby the net amount of output electrical energy produced is increased.

2. The combination as claimed in claim 1, wherein said means for extracting energy and selectively supplying energy includes apparatus capable of being operated bi-directionally, in terms of both direction and force, in order to extract power and to selectively supply power.

3. The combination as claimed in claim 2, wherein said bi-directionally operating apparatus include one of a linear electric generator (LEG) also capable of functioning as a motor, a linear-to-rotary translator coupled to a rotary electric generator/motor.

4. The combination as claimed in claim 2 wherein the means for selectively supplying energy to one of the two elements includes a computational device and wherein signals indicative of the displacement and velocity of one of the two elements relative to the other are applied to the computational device and, in response to certain conditions of the displacement and velocity, power is selectively supplied to one of the two elements to extend its displacement and increase its velocity.

5. The combination as claimed in claim 2 wherein the means for selectively supplying energy to one of the two elements includes a computational device and wherein signals indicative of at least one of the displacement, velocity and acceleration of one of the two elements relative to the other, are applied to the computational device and, in response to certain conditions of at least one of the displacement, velocity and acceleration, power is selectively supplied to one of the two elements to extend its displacement and increase its velocity and tend to drive the WEC into resonance with respect to the waves incident on the WEC.

6. The combination as claimed in claim 4 wherein said apparatus capable of being operated bi-directionally includes a first converting means and a four-quadrant power converter;
the first converting means having a first end and a second end and the four-quadrant power converter having first and second ends;
the first converting means being coupled at its first end to one of the two elements and being coupled at its second end to the first end of the four-quadrant power converter;
the first converting means being responsive to one of a force, torque and energy applied to its first input for producing a voltage and current corresponding thereto at its second end, and said first converting means being responsive to a voltage and current applied at its second end for producing one of a force, torque and energy corresponding thereto at its first end; and
the second end of the 4-quadrant power converter being connected to: (a) a load to which energy/power is supplied when energy/power is being extracted form the WEC; and (b) a power source for supplying the power selectively supplied to one of the two elements when energy/power is being supplied to the WEC.

7. The combination as claimed in claim 6 one of the two elements is a shell and the other one of the two elements is a shaft, and wherein the 4-quadrant power converter produces the following four conditions: 1) positive torque/force with positive speed of the shell/shaft, 2) positive torque/force with negative speed of the shell/shaft, 3) negative torque/force with positive speed of the shell/shaft, and 4) negative torque/force with negative speed of the shell/shaft.

8. The combination as claimed in claim 7, wherein one of the two elements is a shell and the other one is a shaft and wherein the 4-quadrant power converter produces the following four operating conditions:
(a) a positive, upward, force at the output of the first converter with positive, upward, speed when the relative shell position is below a desired neutral position and the shell speed is positive, upward;
(b) a positive, upward, force at the output of the first converter with negative, downward, speed when the relative shell position is below a desired neutral position and the shell speed is negative, downward;
(c) a negative, downward, force at the output of the first converter with positive, upward, speed when the shell position is above a desired neutral position and the shell speed is positive, upward; and
(d) a negative, downward, force at the output of the first converter with negative, downward, speed when the shell position is above a desired neutral position and the shell speed is negative, downward; and
wherein the function of the four operating condition is to cause resonance of the WEC with the ocean waves.

9. The combination as claimed in claim 7, wherein the operation of the 4-quadrant power converter is controlled by a computing device which functions to control when power is extracted from the WEC and when power is supplied to the WEC.

10. The combination as claimed in claim 1, wherein said means for extracting energy and for supplying energy includes one set of apparatus which, in response to the relative motion between the two elements, produces an output voltage and current; and a second set of apparatus capable of supplying power to one of the two elements tending to cause resonance of the WEC with the ocean waves.

11. The combination as claimed in claim 1 including a computational device for controlling when power is extracted from the WEC and when power is supplied to the WEC, and wherein for a WEC exhibiting strong restoring forces power is supplied to the WEC before it reaches its maximum displacement; and wherein for a WEC exhibiting weak restoring forces power is supplied to the WEC after it reaches its maximum displacement.

12. A combination comprising:
a wave energy converter (WEC) having two elements intended to be placed in a body of water, the two elements being able to move relative to each other in response to forces applied to the WEC by the body of water; at least one of the two elements being a wave energy absorber;
a power take off device (PTO) connected between the two elements, the PTO being responsive to movement between the two elements to produce electric energy; said PTO being characterized in that it can also cause movement of one of the two elements relative to the other; and
means connected between a source of electric energy and the PTO including means for sensing and determining the displacement and velocity of one of the two elements relative to the other and, based on predetermined criteria, for selectively and actively supplying power to the PTO for causing the PTO to impart energy to one of the two elements for selectively causing an increase in the velocity of said one of the two elements in order to increase the net power produced by the PTO.

13. The combination as claimed in claim 12, wherein said PTO is a linear electric generator (LEG) which can also function as a linear electric motor.

14. The combination as claimed in claim 13, wherein said LEG includes a permanent magnetic assembly (PMA) and an induction coil assembly (ICA), wherein one of said PMA and ICA is attached to one of said two elements and the other one of said PMA and ICA is attached to the other one of said two elements; and wherein when said PMA passes over said ICA a voltage is generated.

15. The combination as claimed in claim 14, wherein said means for sensing and determining the displacement and velocity includes a computing device responsive to predetermined command signals to control the application of electrical energy from said source of electric energy to the ICA of said PTO.

16. The combination as claimed in claim 15, wherein the predetermined command signals include; (a) the speed of one of the two elements relative to the other one of the two elements; and (b) the position of one of the two elements relative to the other one of said two elements.

17. The combination as claimed in claim 16, wherein the ICA is coupled to an output load for supplying electricity to that load corresponding to energy absorbed by the LEG from the WEC and transferred to said load; and wherein said means connected between a source of electric energy and the PTO for selectively supplying power to the PTO includes means for selectively applying power from said power source to the ICA.

18. The combination as claimed in claim 17, wherein one of said two elements is a shell and the other one of said two elements is a shaft and wherein said computing device is programmed to determine the application of power to the ICA and via the LEG to the shell and shaft.

19. The combination as claimed in claim 12, wherein the PTO includes a device which can function as a motor/generator and a 4-quadrant power converter, the motor/generator device being coupled at one end to one of the two elements and at another end to one end of the 4-quadrant power converter; the 4-quadrant power converter being coupled at another end to said load and to said source of electrical energy; and wherein said means for sensing and determining the displacement and velocity includes a computing device for controlling the operation and function of the 4-quadrant power converter.

20. The combination as claimed in claim 19, wherein the 4-quadrant power converter produces the following four conditions: 1) positive torque (force) with positive speed, 2) positive torque (force) with negative speed, 3) negative torque (force) with positive speed, and 4) negative torque (force) with negative speed.

21. The combination as claimed in claim 20 wherein one of the two elements is a shell and the other one of the two elements is a shaft and wherein the 4-quadrant power converter produces the following four operating conditions:
(a) a positive, upward, force at the output of the PTO with positive, upward, speed when the relative shell position is below a desired neutral position and the shell speed is positive, upward;
(b) a positive, upward, force at the output of the PTO with negative, downward, speed when the relative shell position is below a desired neutral position and the shell speed is negative, downward;
(c) a negative, downward, force at the output of the PTO with positive, upward, speed when the shell position is above a desired neutral position and the shell speed is positive, upward; and
(d) a negative, downward, force at the output of the PTO with negative, downward, speed when the shell position is above a desired neutral position and the shell speed is negative, downward;
wherein the function of the four operating condition is to cause resonance of the WEC with the ocean waves.

22. The combination as claimed in claim 21, wherein the operation of the 4-quadrant power converter is controlled by said computing device which functions to control whether power is supplied to the WEC or whether power is extracted from the WEC and the time when extraction and the supplying of power occurs.

23. The combination as claimed in claim 12, wherein the power supplied to the PTO and the energy imparted by the PTO to said one of the two elements tends to cause the components of the WEC to be driven towards resonance.

24. The combination as claimed in claim 12, wherein the PTO includes apparatus which can be operated bi-directionally, in terms of both direction and force, in order to extract power and to selectively supply power.

25. A combination comprising:
a wave energy converter (WEC) having two elements intended to be placed in a body of water, the two elements being able to move relative to each other in response to forces applied to the WEC by the body of water;
a power take off device (PTO) connected between the two elements, the PTO being responsive to movement between the two elements to produce electric energy; and
means connected between a source of electric energy and the PTO including means for sensing and determining selected ones of the displacement, velocity and acceleration of one of the two elements relative to the other and, based on predetermined criteria, for selectively and actively supplying power to the PTO for causing the PTO to impart energy to one of the two elements of the WEC to cause said one of the two elements to move in a direction to increase its velocity and to increase the net power produced by the PTO.

26. A method for increasing the efficiency of a wave energy converter WEC in the production of an electric output where the WEC includes two elements intended to be placed in a body of water, the two elements being able to move relative to each other in response to forces applied to the WEC by the body of water; comprising the steps of:

sensing the displacement of one of the two elements as it moves up and down relative to a null position;

determining the speed of one of the two elements as it moves up and down relative to the null position;

determining when the speed of the one of the two elements is at or close to zero; and selectively and actively supplying power to one of the two elements for increasing its speed and displacement and thereby increasing the power generated by the WEC.

27. The method as claimed in claim 26, wherein power is supplied to the one of the two elements undergoing movement before it reaches its maximum displacement.

28. The method as claimed in claim 26, wherein power is supplied to the one of the two elements undergoing movement after it reaches its maximum displacement.

29. The combination comprising:

a wave energy converter (WEC) having two elements intended to be placed in a body of water, the two elements being able to move relative to each other in response to forces applied to the WEC by the body of water;

a power take off device (PTO) connected between the two elements shaft and the shell, the PTO being responsive to movement between the to extract energy from the WEC and produce an output voltage and current which is a function of the relative movement between the two elements;

means connected between the two elements including means for sensing and determining selected ones of the displacement, velocity and acceleration of one of the two elements relative to the other and based on predetermined criteria for selectively and actively supplying a force ($F_{PTO}$) to one of the two elements for causing an increase in the power generated by the WEC; the force ($F_{PTO}$) being a function of one of: (a) position and speed of one the two elements relative to the other body; and (b) position and acceleration of one the two elements relative to the other body for producing "quasi-resonance" of the WEC.

30. The combination as claimed in claim 29 wherein one of the two elements is a shell and the other one of the two elements is a shaft, and wherein the force ($F_{PTO}$), may be expressed as:

$$F_{PTO} = \alpha \cdot x + \beta \cdot \dot{x} + \gamma \cdot \ddot{x}$$

Where x is the shell-shaft position relative to a desired "neutral" point (in meters), $\dot{x}$ is the shell-shaft speed (in meters per second), $\ddot{x}$ is shell-shaft acceleration (in meters per second squared), $\alpha$ is a spring coefficient (in Newtons per meter), $\beta$ is a damping coefficient (in Newtons per meter per second), and $\gamma$ is a mass coefficient (in Newtons per meter per second squared); and wherein the parameters $\alpha$, $\beta$, and $\gamma$ are chosen for existing wave conditions to optimize capture of wave energy by the WEC.

31. The combination as claimed in claim 30, wherein said means for sensing and determining selected ones of the displacement, velocity and acceleration includes a computing device programmed to select and process the parameters $\alpha$, $\beta$, and $\gamma$; and wherein selection of the parameters includes determining the period of the predominant waves and selecting the parameters to achieve resonance for this wave period.

32. The combination comprising:

a wave energy converter (WEC) having two elements intended to be placed in a body of water, the two elements being able to move relative to each other in response to forces applied to the WEC by the body of water;

a power take off device (PTO) connected between the two elements, the PTO being responsive to movement between the two elements to extract energy from the WEC and produce an output voltage and current which is a function of the relative movement between the two elements; and the PTO including means for sensing and determining selected ones of the displacement, velocity and acceleration of one of the two elements relative to the other for selectively and actively supplying a force to the one of the two elements moving relative to the other, the PTO force being generated by a combination of a generator/motor and a four-quadrant power converter for controlling the current to/from the generator/motor, and a controller for continuously producing set-point signal commands to the four-quadrant power converter for driving the PTO to exert a force between the two elements which is a function of at least one of (i) the relative position and speed of the two elements; and (ii) the relative acceleration and speed of the two elements.

33. The combination comprising:

a wave energy converter (WEC) having two elements intended to be placed in a body of water, the two elements being able to move relative to each other in response to forces applied to the WEC by the body of water;

a power take off device (PTO) connected between the two elements, the PTO being responsive to movement between the two elements to extract energy from the WEC and produce an output voltage and current which is a function of the relative movement between the two elements; and the PTO including means for sensing and determining selected ones of the displacement, velocity and acceleration of one of the two elements relative to the other for selectively and actively supplying a force to the one of the two elements moving relative to the other, the PTO force being produced by a combination of a device which translates linear force and linear motion to rotary torque and rotary motion, a rotary electric generator, a four-quadrant power converter for controlling the current to and from the generator, and a controller for continuously producing at least one of current and torque set-point commands to the four-quadrant power converter for causing the PTO to exert a force between the two elements which is a function of at least one of (i) the position and speed of the two elements; and (ii) acceleration and speed of the two elements.

* * * * *